(12) United States Patent
Weiss et al.

(10) Patent No.: US 12,743,127 B2
(45) Date of Patent: Sep. 22, 2026

(54) PULLEY-BASED ADJUSTABLE STRAP DESIGN FOR VIRTUAL-REALITY HEADSET

(71) Applicant: Meta Platforms Technologies, LLC, Menlo Park, CA (US)

(72) Inventors: Simon Morris Shand Weiss, Seattle, WA (US); Christina Yee, Redmond, WA (US); Robert Coleman Skelton, Woodinville, WA (US); Ashvath Sharma, Cupertino, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 159 days.

(21) Appl. No.: 18/583,730

(22) Filed: Feb. 21, 2024

(65) Prior Publication Data

US 2024/0281029 A1 Aug. 22, 2024

Related U.S. Application Data

(60) Provisional application No. 63/486,452, filed on Feb. 22, 2023.

(51) Int. Cl.

*G06F 1/16* (2006.01)
*F16M 13/04* (2006.01)
*G02B 27/01* (2006.01)

(52) U.S. Cl.

CPC ............ *G06F 1/163* (2013.01); *F16M 13/04* (2013.01); *G02B 27/0176* (2013.01)

(58) Field of Classification Search

CPC ................ F16M 13/04; G02B 27/0176; G02B 2027/0154; G06F 1/163; G06F 1/1601; A43C 11/165; A45F 5/1525; F16G 11/12

See application file for complete search history.

(56) References Cited

U.S. PATENT DOCUMENTS 2,926,406 A * 3/1960 Zahnor .................. A42B 3/145 2/418
5,321,416 A * 6/1994 Bassett .................. A42B 3/145 348/121
6,708,376 B1 * 3/2004 Landry .................. A42B 3/145 2/418

(Continued)

*Primary Examiner* — Allen L Parker
*Assistant Examiner* — Martin Antonio Asmat Uceda
(74) *Attorney, Agent, or Firm* — McDermott Will & Schulte LLP

(57) ABSTRACT

Systems and methods are provided for a head-wearable device. The head-wearable device can include a display, a retractable side strap, and a housing. The housing includes an anchor point, an adjustment mechanism configured to change an exposed length of the retractable side strap, and a cable. The cable includes a first end and a second end coupled the cable-spooling portion of the adjustment mechanism and an intermediary portion of the cable that travels around the anchor point and is coupled to the retractable side strap. The cable is maintained at a predetermined tension by at least the adjustment mechanism or the anchor point. When the adjustment mechanism is adjusted, the cable winds/unwinds around the first or second cable-spooling portion of the adjustment mechanism, adjusting the exposed length of the retractable side strap to accommodate for different head sizes for users of the head-wearable device.

20 Claims, 20 Drawing Sheets

(56) References Cited

U.S. PATENT DOCUMENTS 7,707,695 B2 * 5/2010 Dubois .................. A42B 3/145
2/418
8,161,576 B2 * 4/2012 Lemke .................. A42B 3/145
2/418
8,170,261 B2 * 5/2012 Danielson .............. H04R 5/033
381/377
9,161,588 B2 * 10/2015 Chen ...................... A42B 3/324
9,179,729 B2 * 11/2015 Cotterman ............... A42B 3/08
9,897,812 B2 * 2/2018 Miller ................ G02B 27/0176
10,071,307 B1 * 9/2018 Castelli ................. A63F 13/211
10,251,289 B2 * 4/2019 Chen ...................... G02B 7/002
10,357,401 B2 * 7/2019 Hsu ........................... A61F 9/06
10,656,670 B2 * 5/2020 Hu ........................ A45F 5/1516
10,670,870 B2 * 6/2020 Chueh ................ G02B 27/0176
10,774,987 B2 * 9/2020 Xu .......................... G06F 3/011
10,873,799 B2 * 12/2020 Wang ..................... H04R 1/028
10,942,544 B2 * 3/2021 Xu .......................... G06F 3/011
11,181,748 B1 * 11/2021 Williamson ....... G02B 27/0093
11,419,391 B2 * 8/2022 Dong ...................... F16H 19/04
11,619,822 B2 * 4/2023 Jen ..................... G02B 27/0176
345/8
11,714,454 B1 * 8/2023 Wu ........................ G02B 7/002
361/679.03
11,846,390 B2 * 12/2023 Howard ................. F16M 13/04
11,880,040 B2 * 1/2024 Weiss ....................... A44C 5/22
11,982,400 B2 * 5/2024 Roig ........................ G06F 3/011
12,013,723 B2 * 6/2024 Kuronuma ......... G02B 27/0176
12,392,987 B2 * 8/2025 Hsieh ....................... G02B 7/09
12,399,372 B1 * 8/2025 Masse ..................... G06F 1/163
2002/0029399 A1 * 3/2002 Hill ......................... A61F 9/026
2/13
2002/0118506 A1 * 8/2002 Saito ....................... G06F 1/163
361/679.03
2009/0066607 A1 * 3/2009 Yasuda .............. G02B 27/0176
345/8
2010/0251524 A1 * 10/2010 Chen .................... A43C 11/165
24/713.2
2017/0227793 A1 * 8/2017 Abreu .................... H04R 1/028
2017/0273390 A1 * 9/2017 Maloney ................ A42B 3/142
2017/0337737 A1 * 11/2017 Edwards ................ F16M 13/04
2019/0346682 A1 * 11/2019 Kang ................. G02B 27/0176
2019/0369659 A1 * 12/2019 Hu ..................... G02B 27/0176
2020/0042035 A1 * 2/2020 Chen ....................... G06F 1/163
2024/0093758 A1 * 3/2024 Mossop .................. F16G 11/12
2024/0097423 A1 * 3/2024 Martinez .................. A42B 7/00

* cited by examiner

Figure 3A:
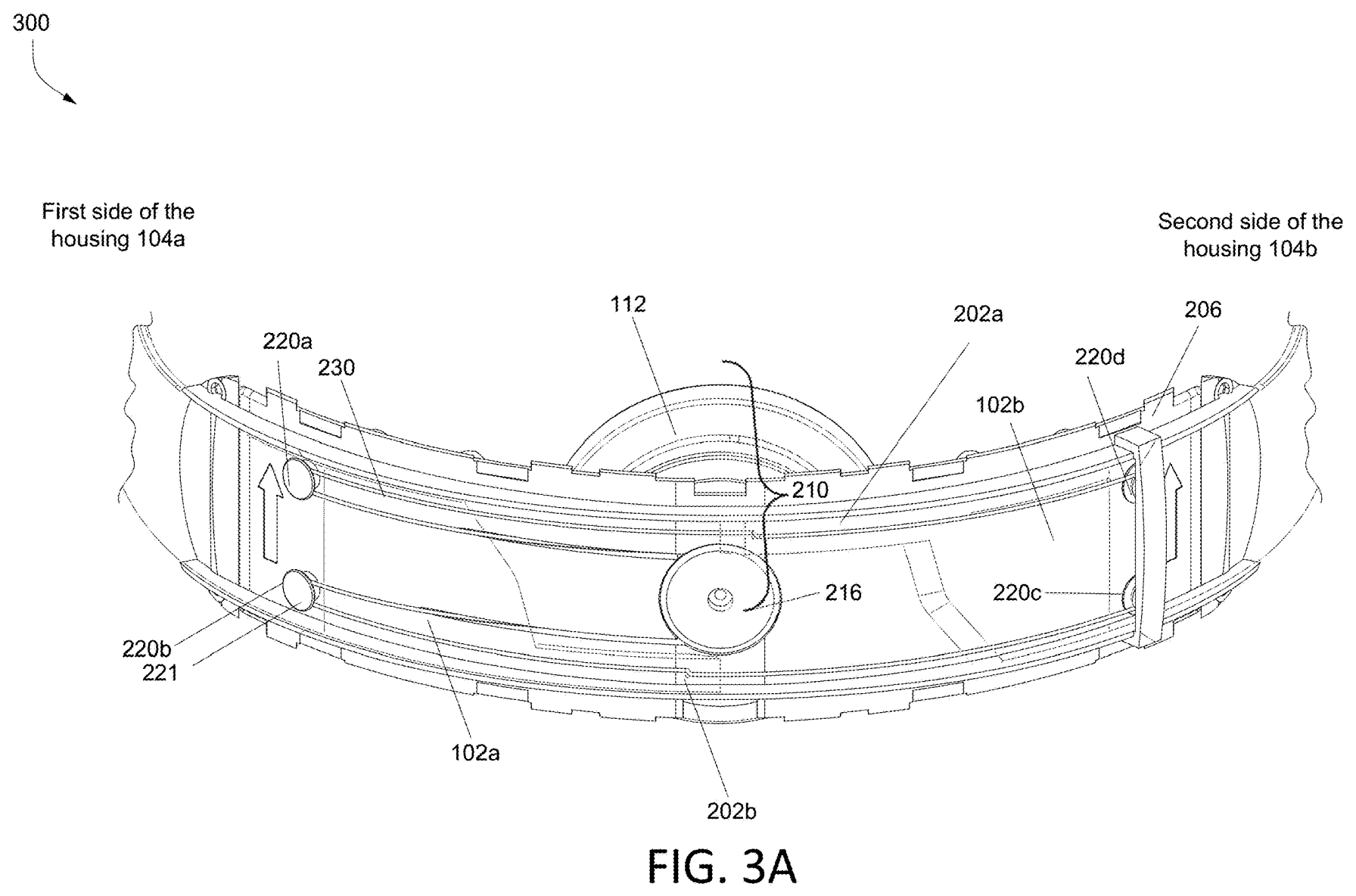

Second side of the housing 104b

206

220d

102b

220c

202a

216

210

112

202b

102a

230

220a

220b

221

First side of the housing 104a

810
Provide a display

812
Provide a retractable side strap coupled with the display, the retractable side strap including a housing, wherein the housing is formed by:

814
Provide an anchor point

816
Provide a cable 818a
a first end of the cable coupled to a first cable-spooling portion of the adjustment mechanism 818b
an intermediary portion of the cable that travels around the anchor point and is coupled with a portion the retractable side strap, and 818c
a second end of the cable coupled to a second cable-spooling portion of the adjustment mechanism 820
Provide an adjustment mechanism configured to be adjusted to change an exposed length of the retractable side strap that is outside of the housing 822
Provide at least one of the adjustment mechanism and the anchor point maintain the cable at a predetermined tension, such that, when the adjustment mechanism is adjusted, the adjustment mechanism 824
Winds the cable around the first cable-spooling portion of the adjustment mechanism or the second cable-spooling portion of the adjustment mechanism 826
Adjusts the exposed length of the retractable side strap to allow the head-wearable device to accommodate respective head sizes for a plurality of users of the head-wearable device

Figure 8

PULLEY-BASED ADJUSTABLE STRAP DESIGN FOR VIRTUAL-REALITY HEADSET

CROSS-REFERENCE TO RELATED APPLICATIONS

This application claims priority to U.S. Prov. App. No. 63/486,452, filed on Feb. 22, 2023, and entitled "Pulley-Based Adjustable Strap Design for Virtual-Reality Headset," which is incorporated herein by reference.

TECHNICAL FIELD

This relates generally to artificial-reality headsets, including but not limited to techniques for adjusting the strap fastened to an artificial-reality headset while on the user's head.

BACKGROUND

Artificial reality head-wearable devices are used in a variety of applications from medical to consumer products to provide an immersive user experience. Specifically, artificial reality head-wearable devices can be used for short or long periods of time and on a variety of different users. Users have a wide variety of head sizes, and while many existing systems allow you to switch out different straps to accommodate larger or smaller head sizes, it's less efficient than an all-inclusive solution especially when multiple users with different head sizes are using the same artificial reality head-wearable device. This presents the issue of having an effective strap system that will comfortably hold the head-wearable device in place but also accommodate a wide range of different head sizes for a plurality of users.

As such, there is a need for addressing one or more of the drawbacks discussed above by developing systems and devices that allow for size adjustments of an artificial-reality head-wearable device without having to switch out multiple straps to accommodate multiple different user head sizes.

SUMMARY

Accordingly, there is a need for a head-wearable device that can be resized for a wide variety of users with different head sizes without needing to install an alternate strap. The system disclosed herein to adjust the retractable side strap in the head-wearable device is configured such that it accommodates a larger variety of head sizes by allowing the ends of the retractable side strap to travel farther into the housing than conventional solutions. This is accomplished by utilizing a tensioned cable coupled to both an adjustment mechanism and the retractable side strap.

One example of an artificial-reality headset is described herein. This example artificial-reality headset includes a display, a retractable side strap coupled with the display, and the retractable side strap coupled to a housing. The housing includes an anchor point, an adjustment mechanism configured to be adjusted to change an exposed length of the retractable side strap that is outside of the housing, and a cable. The cable is configured such that a first end coupled to a first cable-spooling portion of the adjustment mechanism, an intermediary portion of the cable that travels around the anchor point and is coupled with a portion of the retractable side strap, and a second end coupled to a second cable-spooling portion of the adjustment mechanism. Additionally, at least one of the adjustment mechanism and the anchor point maintain the cable at a predetermined tension. Thus, when the adjustment mechanism is adjusted, the adjustment mechanism winds the cable around the first cable-spooling portion of the adjustment mechanism or the second cable-spooling portion of the adjustment mechanism, and adjusts the exposed length of the retractable side strap to allow the head-wearable device to accommodate respective head sizes for a plurality of users of the head-wearable device.

To help further the above goals, different configurations of a head-wearable device are disclosed. The different configurations of the head-wearable device include an adjustment mechanism and a cable that adjust the exposed length of a retractable side strap to accommodate different head sizes of a plurality of users. Additional examples are explained in further detail below.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

FIGS. 3A-3D-2 illustrate components inside of the housing, in accordance with some embodiments.

FIG. 5A-1-5C illustrates example cable-spool embodiments, in accordance with some embodiments.

FIGS. 6A-6C-2 illustrate example artificial-reality systems, in accordance with some embodiments.

FIG. 8 illustrates a flow diagram of a method for forming a head-wearable device, according to some embodiments.

In accordance with common practice, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Figure 1:
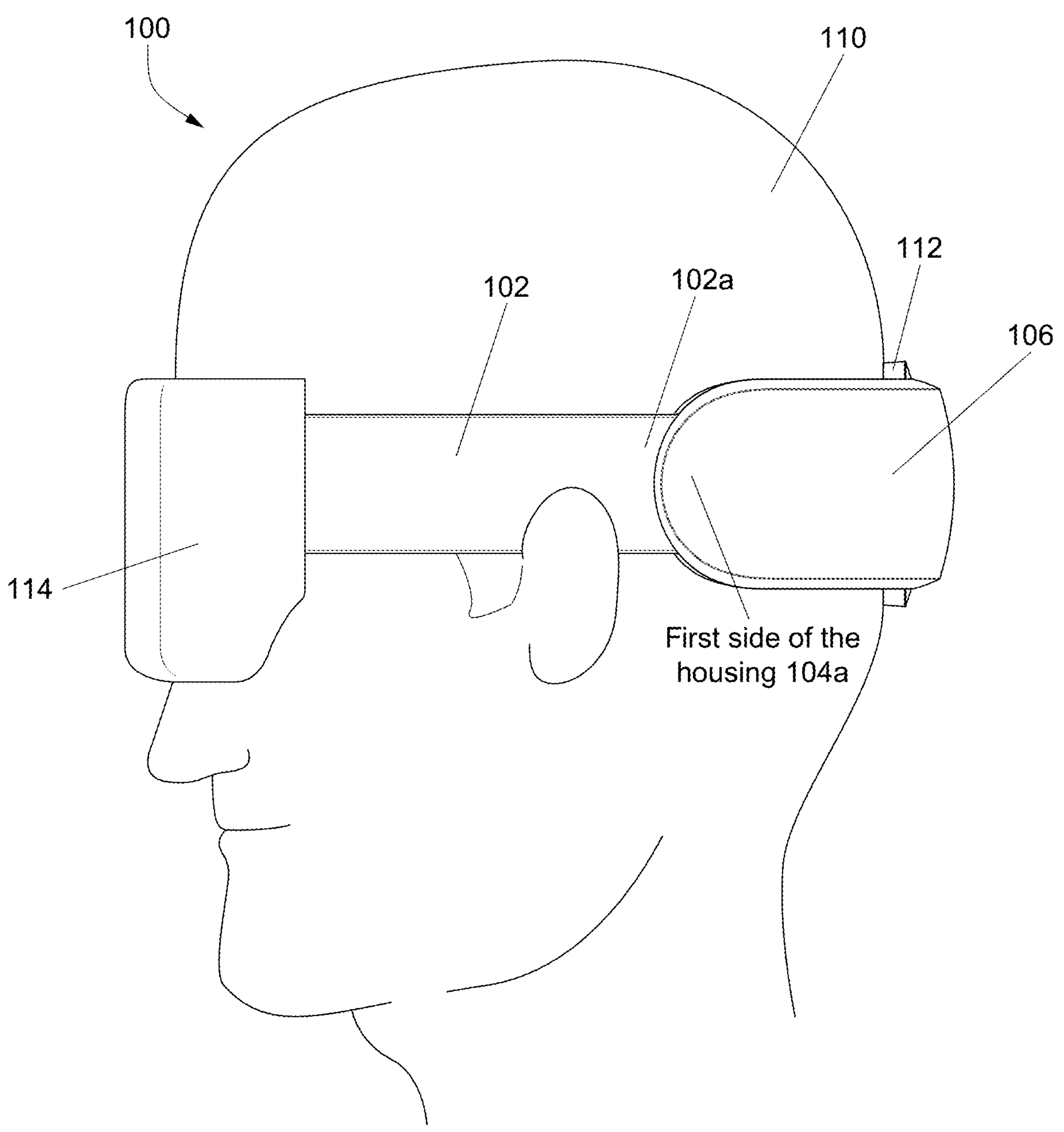
FIG. 1 illustrates a head-wearable device, in accordance with some embodiments.

FIG. 1 illustrates a head-wearable device, in accordance with some embodiments. The head-wearable device 100 includes a head-mounted display (HMD) 114, a housing 106, an adjustment mechanism 210 (FIG. 2) coupled with the housing 106, and one or more retractable side straps 102 coupled to the housing 106. The head-wearable device 100 can be used in real-world environments and/or in artificial reality (AR) environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments.

In some embodiments, the head-wearable device 100 includes a single retractable side strap 102 that is coupled to the HMD 114 and the housing 106. A middle portion 232 of the retractable side strap 102 is coupled to the HMD 114 and a first 102*a* and second end 102*b* of the retractable side strap are coupled to and/or travel through the first 104*a* and second side 104*b* of the housing 106. Alternatively, in some embodiments the head-wearable device 100 includes at least two retractable side straps 102, each retractable side strap 102 including a first end coupled to a distinct portion of the HMD 114 and a second end coupled with the housing 106. In another embodiment, the retractable side strap 102 is coupled to the HMD 114 via an intermediary component. For example, a plate or mounting surface 215 (FIG. 2) can be used to couple the retractable side strap 102 to the HMD 114. In some embodiments, the HMD 114 is formed using a housing containing a lens and the retractable side strap 102 is coupled to the housing containing the lens or other components in the housing. In other words, the housing of the HMD 114 provides a surface to which the one or more retractable side straps 102 can be coupled. The one or more retractable side straps 102 are configured to secure the head-wearable device 100 to the head of the user 110.

In some embodiments, a portion of the adjustment mechanism 210 resides within the housing 106. The adjustment mechanism 210 can include an exposed handwheel 112 (or circular wheel) for manual user adjustment. The handwheel 112 can have a predetermined diameter (e.g., 25 mm to 150 mm) with a portion of the handwheel 112 extending outside of the housing 106. For example, the adjustment mechanism 210 can include a handwheel 112 coupled with the housing 106 and a portion of the handwheel 112 extending outside of the housing 106. Alternatively, in some embodiments, the adjustment mechanism 210 includes a lever, a slider, a knob, or other alternate shape. In some embodiments, the adjustment mechanism 210 has features such as notches or teeth to assist the user 110 in gripping the adjustment mechanism 210. The adjustment mechanism 210 can be actuated (e.g., via the handwheel 112) by a user 110 to tighten or loosen the head-wearable device 100 to accommodate the user 110's head. For example, the adjustment mechanism 210, when actuated (via the handwheel 112) in either a first direction (e.g., clockwise) or a second direction (e.g., counterclockwise) by the user 110, adjusts (e.g., increases or decreases) a length of the exposed portion of the retractable strap 102. In particular, the user 110 can actuate a portion of the adjustment mechanism 210 a predetermined amount in a first direction to increase a length of the exposed portion of the retractable side strap 102 and actuate a portion of the adjustment mechanism 210 a predetermined amount in a second direction, opposite the first, to decrease a length of the exposed portion of the retractable side strap 102.

In some embodiments, a portion of the adjustment mechanism 210 is configured to be actuated a predetermined number of times (e.g., the handwheel 112 of the adjustment mechanism 210 can only be rotated two full rotations before the one or more retractable side straps 102 are adjusted to a minimum or maximum length). In some embodiments, a portion of the adjustment mechanism 210 is configured to be actuated in a first or second direction up to a predetermined distance (e.g., the length of the enclosed portion of the retractable side strap and/or 2 to 4 times the diameter of the handwheel 112). In some embodiments, the one or more retractable side straps 102 are adjusted simultaneously in response to actuation of a portion of the adjustment mechanism 210. Alternatively, in some embodiments, the head-wearable device 100 includes more than one retractable side strap 102 and each retractable side strap 102 can be individually adjusted by actuation of a portion of the adjustment mechanism 210 (e.g., the user 110 can select the retractable side strap 102 to adjust such that the adjustment mechanism 210 adjusts the selected retractable side strap 102, or each retractable side strap 102 is coupled with a respective adjustment mechanism 210).

The head-wearable device 100 is configured such that, when the length of the exposed portion of the retractable side strap 102 is increased, the head-wearable device 100 is loosened (e.g., the size of the head-wearable device 100 is increased to accommodate larger head sizes). Similarly, the head-wearable device 100 is configured such that, when the length of the exposed portion of the retractable side strap 102 is decreased, the head-wearable device 100 is tightened (e.g., the size of the head-wearable device 100 is decreased to accommodate smaller head sizes. Additional information on the actuation of the adjustment mechanism 210 is provided below in reference to FIGS. 4A-4C.

Figure 2:
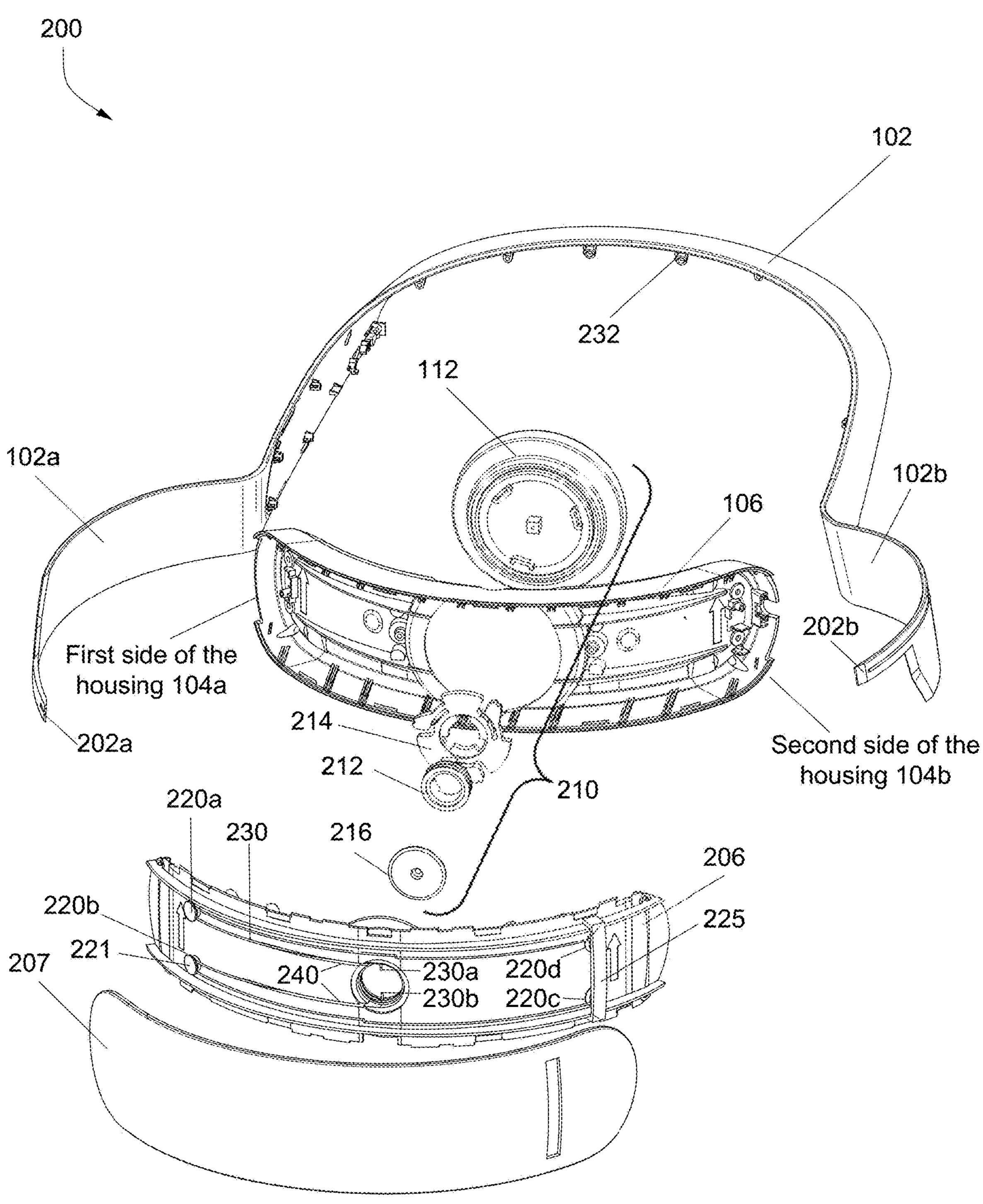
FIG. 2 illustrates an exploded-view of the housing of the head-wearable device, in accordance with some embodiments.

FIG. 2 illustrates an exploded-view of the housing 106 of the head-wearable device 100, in accordance with some embodiments. The exploded view 200 shows a portion of the head-wearable device 100 including the housing 106, the adjustment mechanism 210, the retractable side strap 102, a cable 230, a backplate 206, one or more anchor points 220 coupled to the backplate 206, and internal/external portions of the housing 106.

In some embodiments, the first and second ends 102*a* and 102*b* of the retractable side strap are coupled to and/or travel through opposite sides of the housing 106 (e.g., first and second sides 104*a* and 104*b* of the housing 106). More specifically, the first end 102*a* of the retractable side strap is coupled to and/or travels through the first side 104*a* of the housing 106, and the second end 102*b* of the retractable side strap is coupled to and/or travels through the second side 104*b* of the housing 106. In some embodiments, each end of the retractable side strap 102 includes a tip portion 202*a* and 202*b*. In some embodiments, each tip portion 202*a* and 202*b* is configured to remain enclosed inside of the housing 106 when the first and second ends 102*a* and 102*b* of the retractable side strap 102 are adjusted. Other portions of the retractable side strap 102 can travel both inside and outside of the housing 106. The portions outside of the housing 106 are included in the exposed length of the retractable side strap 102. The first end 102*a* and the second end 102*b* of the retractable side strap 102 travel along a predetermined path inside of the housing 106. One or more components within the housing 106, such as the cable 230, guide the first end

102*a* and the second end 102*b* of the retractable side strap 102 to ensure each end 102*a* and 102*b* of the retractable side strap 102 travels along respective predetermined paths.

In some embodiments, the first end and the second end 102*a* and 102*b* of the retractable side strap overlap each other as the exposed length of the retractable side strap 102 decreases. The overlapping first end and the second ends 102*a* and 102*b* of the retractable side strap 102 allow the head-wearable device 100 to accommodate smaller head sizes. Further, by overlapping, each end of the retractable side strap 102 is configured to travel a farther distance inside of the housing 106 (which allows each end of the retractable side straps 102*a* and 102*b* to travel about 75-80% of the length of the housing 102). In some embodiments, the ends of retractable side strap 102*a* and 102*b* can travel up to 240 mm inside of the housing 106. Compared to existing solutions, the head-wearable device 100 is able to accommodate a broad range of head sizes with a single size strap. In other words, the retractable side strap 102*a* and 102*b* can have a uniform length to accommodate multiple head sizes, whereas existing solutions use straps of specific lengths to accommodate different head sizes. Additionally, the systems and methods disclosed herein allow for the head-wearable device 100 to use smaller and compact housings compared to existing solutions. Specifically, because the first and second ends 102*a* and 102*b* of the retractable side strap are configured to overlap, the housing does not have to be as large to enclose the length of the retractable side strap 102.

In some embodiments, the adjustment mechanism 210 includes a handwheel 112, a gear 214 coupled to the handwheel 112, and a cable-spool 212 coupled to the gear 214. The gear 214 is configured to move in unison with the handwheel 112 when the handwheel 112 is actuated by the user 110 or automatically (e.g., the user 110 stores a custom worn size and the handwheel 112 is automatically actuated to the user's stored worn size after confirmation or other verification). Furthermore, the cable-spool 212 is configured to move in unison with the gear 214 and the handwheel 112 when the handwheel 112 is actuated. In other words, when the handwheel 112 (or other actuating means, such as a lever, a slider, a knob, etc.) of the adjustment mechanism 210 is actuated, the gear 214 and the cable-spool 212 move in conjunction with the adjustment mechanism 210. In some embodiments, the cable-spooling portion 212 is a single drum and in other embodiments, the cable-spool 212 is a double drum. Additional examples of the cable-spool 212 are described in FIGS. 5A-1-5C.

In some embodiments, the cable-spool 212 includes a first cable-spooling portion 510 and a second cable-spooling portion 520 (as shown and described below in FIGS. 5A-1-5C). In some embodiments, the first cable-spooling portion 510 is adjacent to the handwheel 112 and the second cable-spooling portion 520 of the adjustment mechanism 210 is adjacent to housing cover 207. In some embodiments, the first cable-spooling portion 510 of the adjustment mechanism 210 is a first distance (e.g. 0.5 to 2.5 inches) from the user's head (e.g., closer to the user's head and adjacent to the handwheel 112) when the head-wearable device 100 is worn and the second cable-spooling portion 520 of the adjustment mechanism 210 is a second distance (e.g., 2.5 to 4 inches) from the user's head, larger than the first distance, (e.g., further from the user's head and the handwheel 112, and adjacent to housing cover 207) when the head-wearable device 100 is worn. The at least two distinct cable-spooling portions (e.g., first and second and cable-spooling portions 510 and 520) of the cable-spool 212 reduce friction on the cable 230 compared to a cable-spool with only a single cable-spooling portion. Additionally, a second cable-spooling portion reduces amount of cable 230 that is wound over itself and/or reduces the amount of cable 230 that contacts o other portions of the cable 230, which reduces the friction and assists in guiding the cable 230 more efficiently while spooling and unspooling. Thus, by utilizing multiple cable-spooling portions, friction on the cable 230 as it winds around the cable-spool 212 of the adjustment mechanism 210 is reduced, thereby helping to reduce wear on the cable 230 and elongating the time within which the cable 230 needs to be replaced.

In some embodiments, the cable 230 is a single length coupled with the cable-spool 212 of the adjustment mechanism 210. The cable 230 is configured to wrap around the cable-spool 212 when the adjustment mechanism 210 is actuated. The length of the cable 230 is determined based on the distance the retractable side strap 102 travels inside of the housing 106 and/or the number of rotations the adjustment mechanism 210 (e.g., the handwheel 112) can make. Furthermore, while the adjustment mechanism 210 is being actuated and while the cable 230 is winding around the cable-spool 212, the cable 230 is configured to move along a predetermined path inside of the housing 106, as shown and described below in reference to FIGS. 3A, 3B, 4B, and 5C. The cable 230 is also coupled to the retractable side strap 102, such than when the adjustment mechanism 210 is actuated, the cable 230 is configured to move the retractable side strap 102.

In some embodiments, a first end 230*a* of cable 230 is coupled to a first hole 515 of the cable-spool 212 and a second end 230*b* of cable 230 is coupled to a second hole 525 opposite the first hole 515 of the cable-spool 212 (shown and described below in reference to FIGS. 5A-1-5C). In some embodiments, the cable 230 includes a first windable segment extending from the first hole 515 and around a first anchor point 220*a* (e.g., an intermediary portion of the cable 230 starting at the first end 230*a* and traveling around the first anchor 220*a*). The first windable segment is a distinct portion of the of cable 230 that is wound around the first cable-spooling portion 510 of the adjustment mechanism 210 when the adjustment mechanism 210 is actuated. The cable 230 further includes a second windable segment extending from the second hole 525 and around a second anchor point 220*b* (e.g., another intermediary portion of the cable 230 starting at the second end 230*a* and traveling around the second anchor 220*b*). Similarly, the second windable segment is a distinct portion of the cable 230 that is wound around the second cable-spooling portion 520 of the adjustment mechanism 210 when the adjustment mechanism 210 is actuated. In some embodiments, when the adjustment mechanism 210 is actuated in a first direction (e.g., clockwise) the first windable segment starts to wind around the first cable-spooling portion 510 of the adjustment mechanism 210 at the same time that the second windable segment starts to unwind around the second cable-spooling portion 520 of the adjustment mechanism 210. In some embodiments, the rate at which the first and second windable segments wind and unwind are the same, and in other embodiments the rate at which they wind and unwind are distinct. In some embodiments, as the adjustment mechanism 210 is actuated, the cable 230 winds around the spool but without a change to the total length of the cable 230.

In some embodiments, the one or more anchor points 220 are coupled to an interior portion of the housing (e.g., the backplate 206). The one or more anchor points 220 can a fixed pully, a moving pully, or a static post. The one or more anchor points 220 include grooves or channels for facilitating travel of the cable 230. For example, the one or more anchor points 220 are positioned such that an intermediary portion of cable 230 travels from the first cable-spooling portion 510, around the one or more anchor points 220*a*-220*d*, and to the second cable-spooling portion 520. In some embodiments, the grooves or channels of the one or more anchor points 220 include low friction materials, polytetrafluoroethylene (PTFE), Nylon, Acetal, etc., or treated to reduce friction (e.g., partially lubricated or coated with a low friction coating material (e.g., a PTFE coating)). The one or more anchor points 220 are configured to reduce wear from friction on the cable 230 when the cable 230 travels around the one or more anchor points 220. For example, the one or more anchor points 220 can include pulleys that reduce the friction on the cable 230 as the adjustment mechanism 210 is actuated to adjust the size of the head-wearable device 100.

Figure 4A:
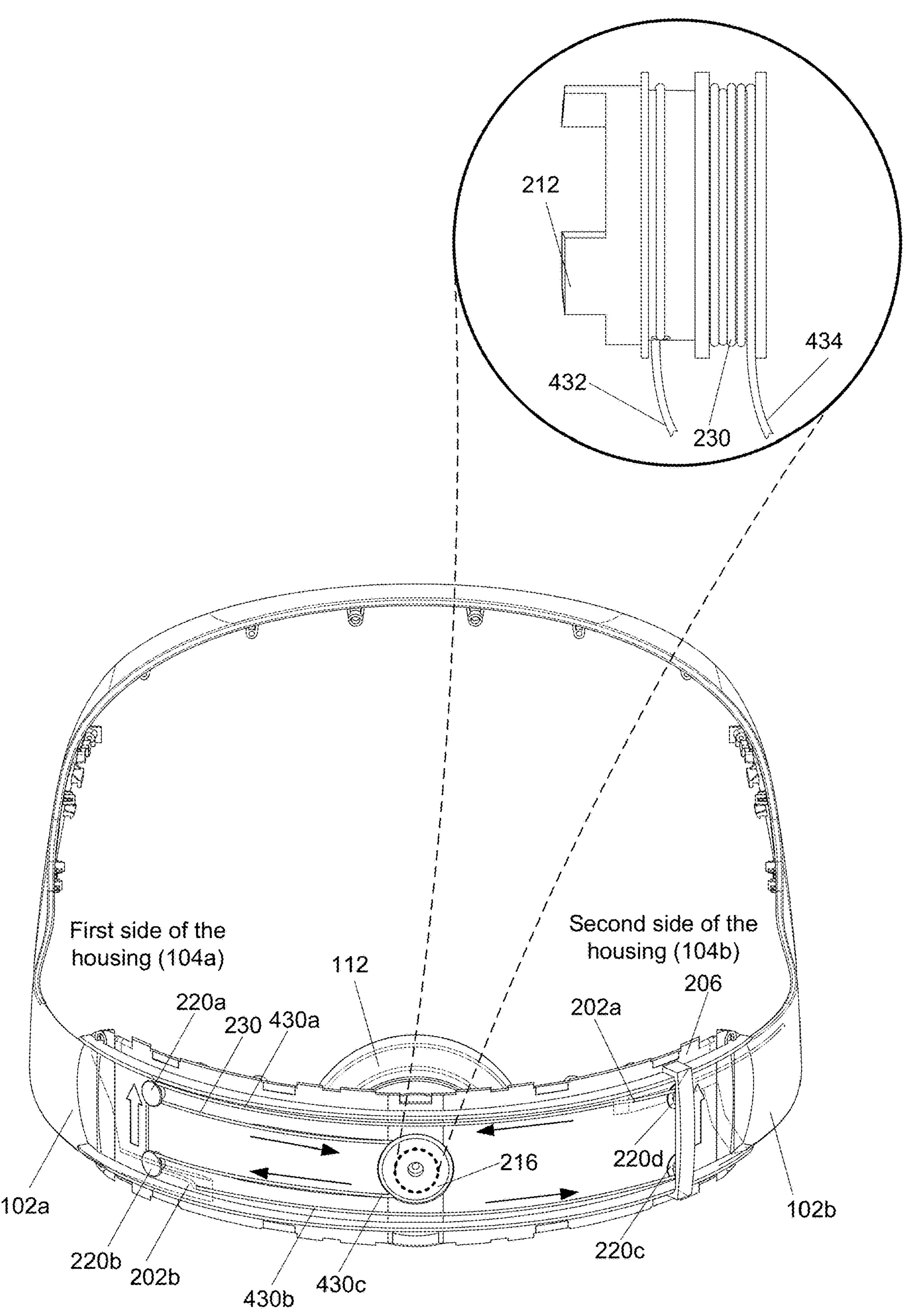
FIG. 4A-4C illustrates the head-wearable device with the retractable side strap fully extended, about halfway between fully retracted and fully extended, and fully retracted, in accordance with some embodiments.
Figure 4B:
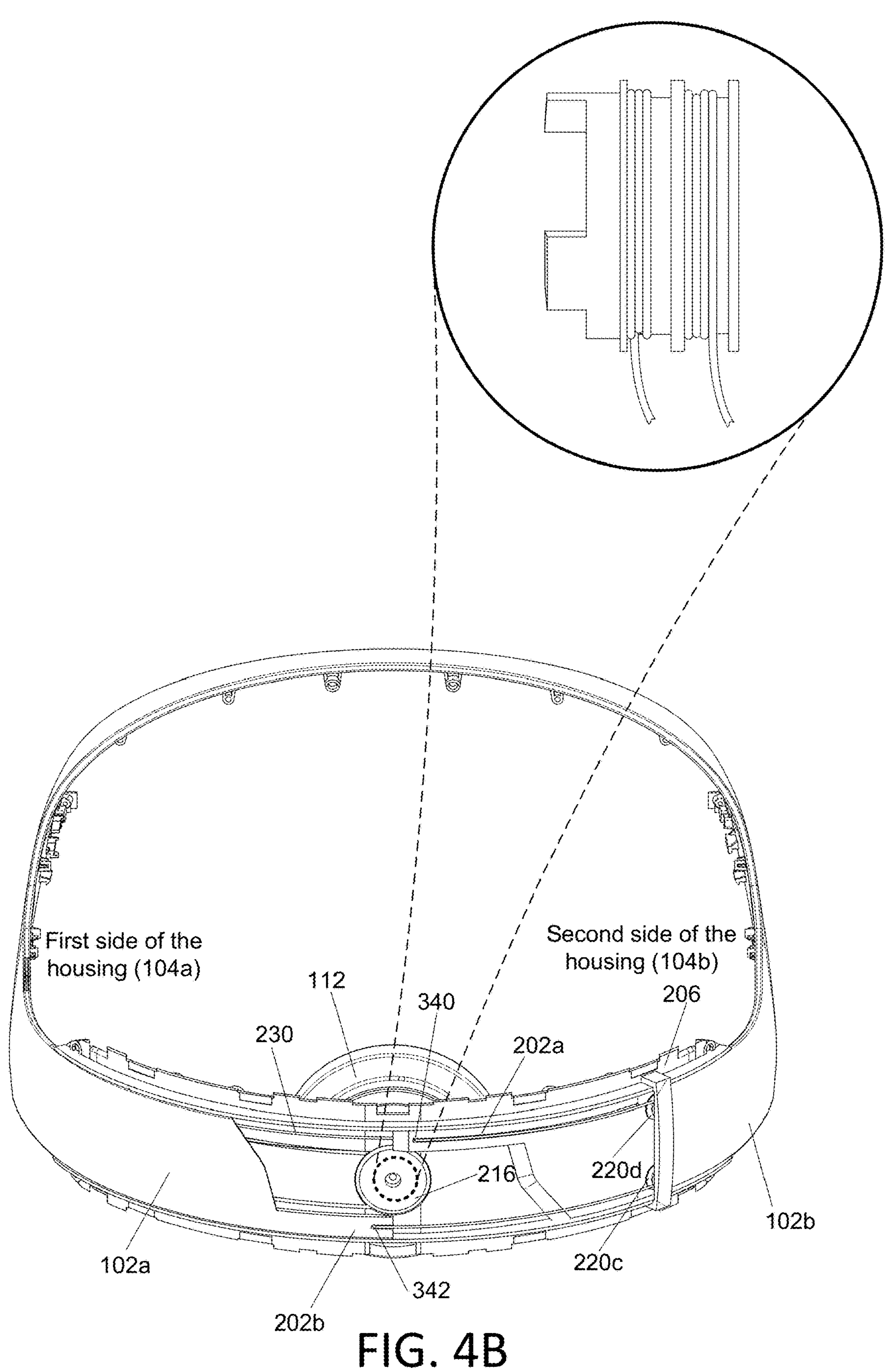
Figure 4C:
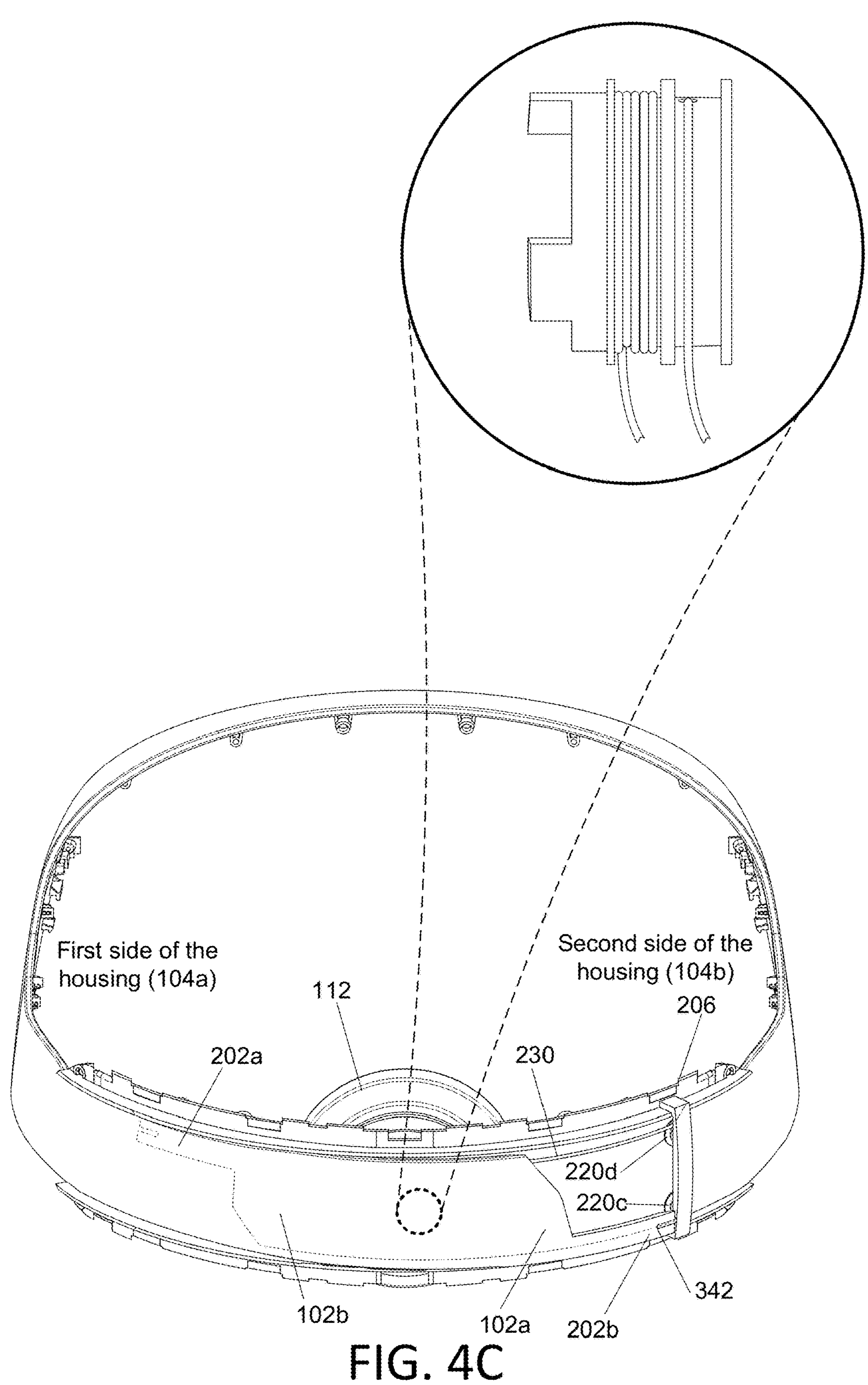

In some embodiments, one or more of anchor points (e.g., the first and second anchor points 220*a* and 220*b*) are positioned on the first side 104*a* of the housing 106 and one or more anchor points (e.g., third and fourth anchor points 220*c* and 220*d*) are positioned on the second side 104*b* of the housing 106. In some embodiment, the one or more anchor points 220 are positioned between the backplate 206 and the first and/or second ends 102*a* and 102*b* of the retractable side strap 102. For example, as shown in FIG. 2, the first and second anchor points 220*a* and 220*b* are coupled to the backplate 206. Alternatively or in addition, in some embodiments, the one or more anchor points 220 are positioned such that the first and/or second ends 102*a* and 102*b* of the retractable side strap 102 are between the backplate 206 and the one or more anchor points 220. For example, as shown in FIG. 2, the third and fourth anchor points 220*c* and 220*d* are coupled to a support beam 225 (which is coupled to the backplate 206) that positions the third and fourth anchor points 220*c* and 220*d* above the backplate 206 creating a gap for the second end 102*b* of the retractable side strap 102 to travel between (as shown in FIGS. 4A-4C). In this way, when the first end 102*a* of the retractable side strap 102 travels from the first side 104*a* of the housing 106 toward the second side 104*b* of the housing 106 it travels over the first and second of anchor points 220*a* and 220*b*, and when the second end 102*b* of the retractable side strap 102 travels from the second side 104*b* of the housing 106 toward the first side 104*a* of the housing 106 it travels underneath the third and fourth anchor points 220*c* and 220*d*. By coupling one or more anchor points 220 to the backplate 206 and one or more anchor points 220 over the backplate 206 (e.g., using the support beam 225), the housing 106 allows the first and second ends 102*a* and 102*b* of the retractable side strap 102 to overlap without contacting or colliding with one another (e.g., one end goes over the opposite end). In some embodiments, the first and second anchor points 220*a* and 220*b* positioned on the first side 104*a* of the housing 106 and the third and fourth anchor points 220*c* and 220*d* positioned on the second side 104*b* of the housing 106 are equidistant from their respective ends of the housing 106, and in other embodiments they are positioned at different distances from their respective ends of the housing 106.

In some embodiments, the anchor points 220 include friction pads on their top surfaces (e.g., top surface 221). The respective top surfaces of the anchor points 220 are adjacent to the first and/or second ends 102*a* and 102*b* of the retractable side strap 102 as shown in FIGS. 4A-4C. As mentioned above, the anchor points 220 are positioned such that the retractable side strap 102 can travel above or below certain anchor points 220 which could create additional friction on the retractable side strap 102 and/or anchor points. The friction pads on the top surfaces of the anchor points 220 reduce or eliminate additional friction created between the anchor points 220 and the retractable strap 102. By reducing or eliminating additional friction, the friction pads allow the first and second ends 102*a* and 102*b* of the retractable strap 102 to move smoothly through the housing 106 and reduce wear on the retractable side strap 102.

In some embodiments, the one or more anchor points 220 and/or the adjustment mechanism 210 are configured to maintain a predetermined tension on the cable 230 (e.g., by keeping the cable 230 taught). By maintaining the cable 230 at a predetermined tension, the head-wearable device 100 enables a user to adjust the to move the retractable side strap 102 when the user 110 actuates the adjustment mechanism 210. This is further shown and discussed in FIGS. 3A-3D-2 below.

The backplate 206 separates the adjustment mechanism 210 from the retractable side strap 102. In some embodiments, the backplate 206 includes friction pads placed between the backplate 206 and the retractable side strap 102, such that while the retractable side strap 102 travels inside the housing 106 (e.g., when the adjustment mechanism 210 is actuated), the friction pads reduce the friction, if any, between the retractable side strap 102 and the backplate 206. The backplate 206 is configured to reduce wear and tear on the adjustment mechanism 210, the cable 230, and/or the retractable side strap 102 by providing a means of guiding the cable 230 and/or the retractable side strap 102 and preventing one or more components of the adjustment mechanism 210 (e.g., the gear 214) from contacting the cable 230 and/or the retractable side strap 102.

The means of guiding the cable 230 includes one or more cable guide paths 240 of the backplate 206, which are configured to limit or direct the movement of the cable 230 within the housing 106 as the adjustment mechanism 210 is actuated. In particular, the one or more cable guide paths 240 prevent the cable 230 from rubbing against and/or getting caught with one or more internal components of the in the housing 106, the one or more the retractable side straps 102, and/or the adjustment mechanism 210. For example, the adjustment mechanism 210 is mechanically coupled with the backplate 206, such that the cable 230 can travel from the cable-spool 212 of the adjustment mechanism via the one or more cable guide paths 240 of the backplate 206 to an anchor point 220. The cable guide paths 240 of the backplate 206 separate the adjustment mechanism 210 and retractable side strap 102 while allowing the cable 230 to travel through the backplate 206 and remain coupled to both the adjustment mechanism 210 and the retractable side strap 102 (as discussed below in reference to FIGS. 4A-4C). Additionally, the cable guide paths 240 prevent the cable 230 from moving freely within the housing 106 which allows the head-wearable device 100 to maintain the cable 230 at the same length by preventing the cable 230 from stretching, being pulled, and/or catching on different components within the housing 106.

The cable guide paths 240 can be one or more cut-out portions of the backplate 206. In some embodiments, the cable guide paths 240 are molded portions of the backplate 206. The cable guide paths 240 have a width greater than a dimeter of the cable 230 to prevent or reduce friction between the surfaces of the cable guide paths 240 and the cable 230 while the cable 230 travels through the backplate 206. In some embodiments, the cable guide paths 240 include an inlet and an outlet for allowing the cable 230 to travel from a respective cable-spooling portion to an anchor point 220, and vice versa. The cable guide paths 240 allow for a portion of the cable 230 to be embedded or entrenched in a portion the backplate 206 such that contact between the retractable strap 102 and the cable 230 is minimal (e.g., via respective tip portions 202*a* and 202*b*) when the adjustment mechanism 210 is actuated. The minimal contact between the cable 230 and the retractable strap 102 reduces friction on the cable 230 increasing the cable 230's longevity. Additionally or alternatively, in some embodiments, the backplate 206 includes friction pads placed between the backplate 206 and the retractable side strap 102, such that when the retractable side strap 102 travels inside the housing 106, the friction pads reduce the friction, if any, between the retractable side strap 102 and the backplate 206 when the retractable side strap 102 is moved by actuation of the adjustment mechanism 210.

Figure 3B:
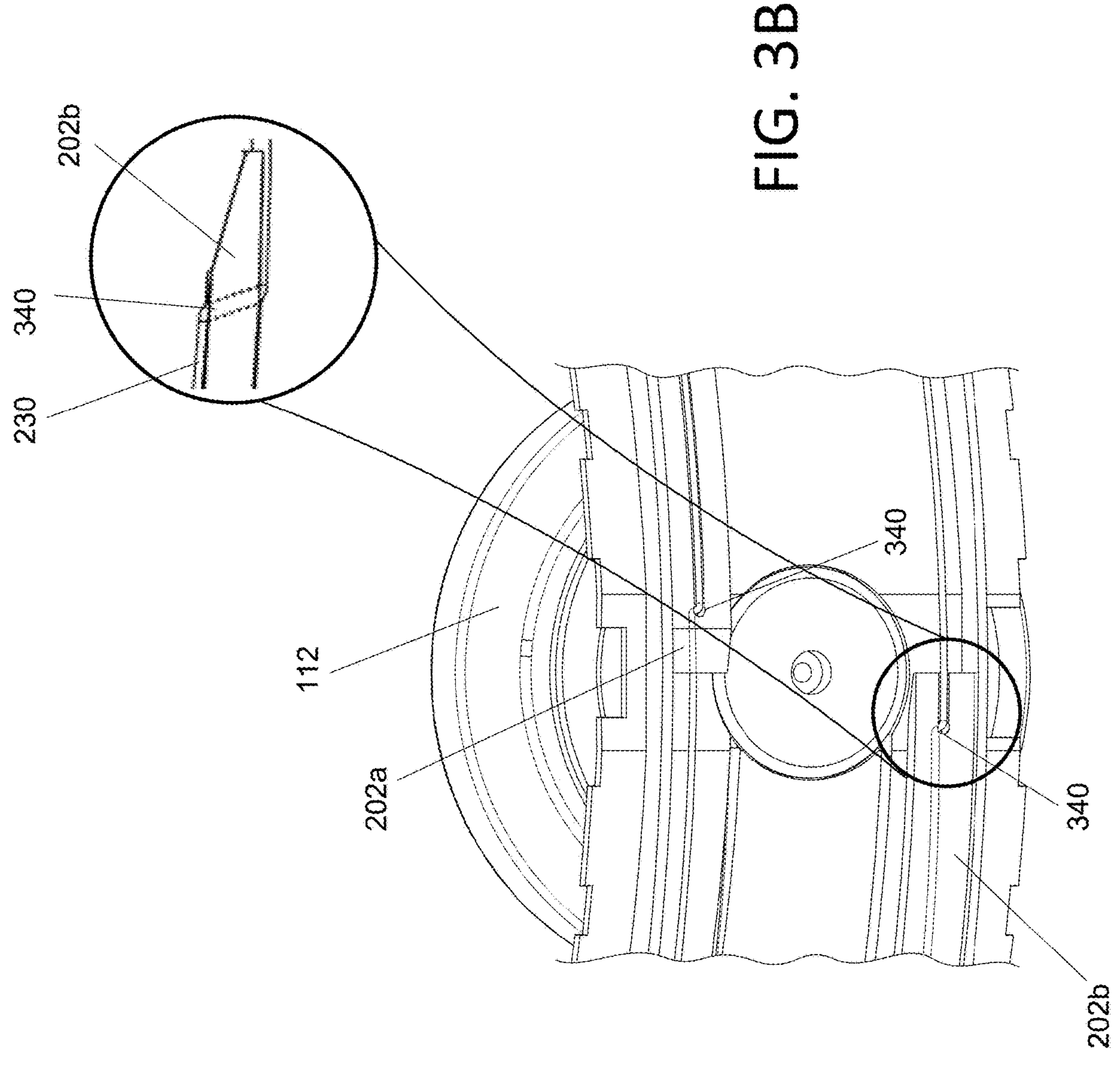

FIGS. 3A-3D-2 illustrate components inside of the housing, in accordance with some embodiments. FIG. 3A illustrates the backplate 206, a portion of the adjustment mechanism 210, the anchor points 220*a*-220*d*, the cable 230, the cap 216 and the retractable side strap 102. FIG. 3A further illustrates the pre-determined path of the cable 230. In some embodiments, as mentioned in FIG. 2, the cable 230 is one continuous length that travels on a predetermined path from the adjustment mechanism 210, to one or more anchor points 220*a*-220*d*, and then back to the adjustment mechanism 210.

As mentioned in FIG. 2, the first end 230*a* of the cable 230 is coupled to a first cable-spooling portion 510 and an intermediary portion of the cable 230 then extends from the first end 230*a* of the cable 230 and travels through a cable guide paths 240*a* of backplate 206 to the first anchor point 220*a*. The cable 230*a* travels around the first anchor point 220*a* and couples to the tip portion 202*a* of the second end 102*b* of the retractable side strap 102 (discussed below in reference to FIG. 3D). The cable 230 continues to travel through the tip portion 202*a* of the second end of the retractable side strap 102*b* to the fourth anchor point 220*d* while traveling on top of or over the retractable side strap 102. The cable 230 travels around the fourth anchor point 220*d* toward and around the third anchor point 220*c* before coupling to the tip portion 202*b* of the first end 102*a* of the retractable side strap. The cable 230 then travels to and around the second anchor point 220*b* through another cable guide paths 240*b* of the backplate 206, and back to the cable-spool 212 of the adjustment mechanism 210. The cap 216 further guides the cable 230 from the cable guide paths 240 of the backplate 206 into the adjustment mechanism 210 while still containing the spooling cable 230 to the adjustment mechanism. When the adjustment mechanism 210 is actuated, the cable 230 pulls on respective ends of the retractable side strap 102 (e.g., the first and second tip portion 202*a* and 202*b*) to adjust the size of the head-wearable device 100.

A partially assembled view 300 of the housing shows the cable 230 held at a predetermined tension. Specifically, the cable 230 is configured to remain taught as it travels from the first cable-spooling portion 510 (FIGS. 5A-1-5C) to the second cable-spooling portion 520 (FIGS. 5A-1-5C) of the cable-spool 212 and vice versa. By maintaining the cable 230 at the predetermined tension, the adjustment mechanism 210 (FIG. 2) allows the cable 230 to move the first and second ends 102*a* and 102*b* of the retractable side strap 102 efficiently and consistently when actuated (e.g., via hand-wheel 112). In particular, maintaining the cable 230 at the predetermined tension prevents or limits the cable 230 from slipping (on surfaces it contacts), defines predetermined movement paths for the first and second ends 102*a* and 102*b* of the retractable side strap 102, and/or defines a predetermined force for actuating the adjustment mechanism 210 (e.g., the same force exerted by the user is needed to tighten or loosen the head-wearable device 100). In some embodiments, the adjustment mechanism 210 maintains the cable 210 at a predetermined tension using friction between the cable-spool 212 of the adjustment mechanism 210 and the cable 230. Alternatively or in addition, in some embodiments, the predetermined tension is maintained by winding the cable 230 around the cable-spool 212 (e.g., the respective cable-spooling portions) a predetermined number of turns (e.g., during manufacturing or user configuration). The predetermined number of turns (at which the cable 230 is wound) can be the same for the first and second cable-spooling portions 510 and 520 (e.g., at least two turns for each cable-spooling portion) or distinct (e.g., at least two turns for the first cable-spooling portion 510 and at least three turns for the second cable-spooling portion 520). As described above in reference to FIG. 2, in some embodiments, the cable 230 is wound and/or unwound from each respective cable-spooling portion at the same rate when the adjustment mechanism 210 is actuated, which allows the head-wearable device 100 to maintain the predetermined number of turns and/or predetermined tension.

The predetermined tension of the cable 230 can be adjusted to account for wear and tear that occurs over time. In some embodiments, the user can adjust the cable 230 tension such that the adjustment mechanism 210 can be actuated at their desired force (e.g., less actuation force required for a child than an adult). The head-wearable device 100 is configured to prevent the user from adjusting the cable 230 tension above or below a predetermined threshold to prevent the cable 230 from being damaged and/or having such low tension that the one or more retractable side straps 102 cannot be adjusted. For example, after the cable tension 230 is increased above the predetermined threshold, the adjustment mechanism 210 can gradually release tension in the cable 230 (e.g., by unwinding) and/or move in place to prevent further increase in the cable tension. Similarly, after the cable tension 230 is decreased below the predetermined threshold, the adjustment mechanism 210 can gradually wind the cable 230 to increase tension in the cable 230.

FIG. 3B illustrates the cable 230 coupled with the first and second tip portions 202*a* and 202*b* of the retractable side strap 102, in accordance with some embodiments. As shown in FIG. 3, the cable 230 can travel underneath and/or over respective tip portions 202 of the retractable side strap 102. The respective tip portions 202 of the retractable side strap 102 include a cavity or channel (e.g., a cut-out portion or hole 340 of the retractable side strap 102) that allows the cable 230 to travels through (e.g., respective holes 340). Each hole 340 can be at an angle through the respective tip portions of the retractable side strap 102 such that the respective ends of the retractable side strap 102 are pulled or pushed when the cable 230 is wound and/or unwound. The holes 340 allow for the retractable side strap 102 to be pulled or pushed while reducing the friction between the retractable side strap 102, the cable 230, and the backplate 206 (e.g., by providing a set path or channel for the cable 230 to travel through).

In some embodiments, the respective ends of the retractable side strap 120 include an additional channel disposed on an upper or bottom surface of the retractable side strap 102 and spanning its longitudinal length (e.g., from the hole 340 in the tip portion 202*a* of the retractable side strap all the way to the anchor point 220*d*). The additional channel can protect the cable 230 (e.g., from being pinched or caught on other components of the housing 106) and reduces friction on the cable 230 decreasing wear and tear on the cable 230. For example, when the second end 102*b* of the retractable side strap passes below the first end 102*a* of the retractable side strap, the cable 230 traveling along the length of the second end 102*b* of the retractable side strap is exposed to friction between the first end 102*a* of the retractable side strap and the cable 230 and the additional channel inside the second end 102*b* of the retractable side strap allows the cable 230 to travel the length of the second end 102*b* of the retractable side strap without rubbing against the first end 102*a* of the retractable side strap, significantly reducing friction. Similar to the first tip portion 202*a* on the retractable side strap, the second tip portion 202*b* on the first side 102*a* of the retractable side strap includes a hole 342 that the cable 230 also travels through in a similar manner as described above in reference to the hole 340 in the first tip portion 202*a* on the second side 102*b* of the retractable side strap The two angles the cable 230 travels at through the first and second tip portions 202*a* and 202*b* of the retractable side strap allows the cable 230 to couple to the retractable side strap 102 such that when the adjustment mechanism 210 is actuated in a first direction or a second direction (moving the cable 230), the ends 102*a* and 102*b* of the retractable side strap are moved by with the cable 230. For example, when the user 110 actuates the adjustment mechanism 210 in a first direction (e.g., clockwise), the intermediary portion of the cable 230 that is coupled to the second tip portion 202*b* of the retractable side strap starts moving from the second side of the housing 104*b* to the first side of the housing 104*a*. As an intermediary portion of the cable 230 coupled to the second tip portion 202*b* moves toward the first side of the housing 104*a*, the second end 102*b* of the retractable side strap moves in unison with the cable 230 intermediary portion towards the first side 104*a* of the housing the same distance. In addition, when the adjustment mechanism 210 is actuated in a second direction (e.g., counterclockwise), the intermediary portion of the cable 230 which is coupled to the second tip portion 202*b* of the retractable side strap moves from the first side 104*a* of the housing to the second side 104*b* of the housing, moving the second end 102*b* of the retractable side strap toward the second end 104*b* of the housing 106. The first tip portion 202*a* is configured to move in an opposite direction. For example, when the adjustment mechanism 210 is actuated in a first direction (e.g., clockwise), an intermediary portion of the cable 230 coupled to the first tip portion 202*a* on the first side 102*a* of the retractable side strap travels from the first side 104*a* of the housing towards the second side 104*b* of the housing. As such, when the adjustment mechanism 210 is actuated, the cable 230 moves respective portions of the retractable side strap 102 a predetermined distance from the first side 104*a* of the housing to the second side 104*b* of the housing and/or vice versa. For example, if a first intermediary portion of the cable is moved 3 mm toward the second side 104*b* of the housing, the first end 102*a* of the retractable side strap will also move 3 mm toward the second side 104*b*. Additionally, when the adjustment mechanism 210 is actuated in the second direction (e.g., counterclockwise), the tip portion 202*b* of the retractable side strap and the cable 230 move toward the first end of the housing 104*a*.

Figure 3C:
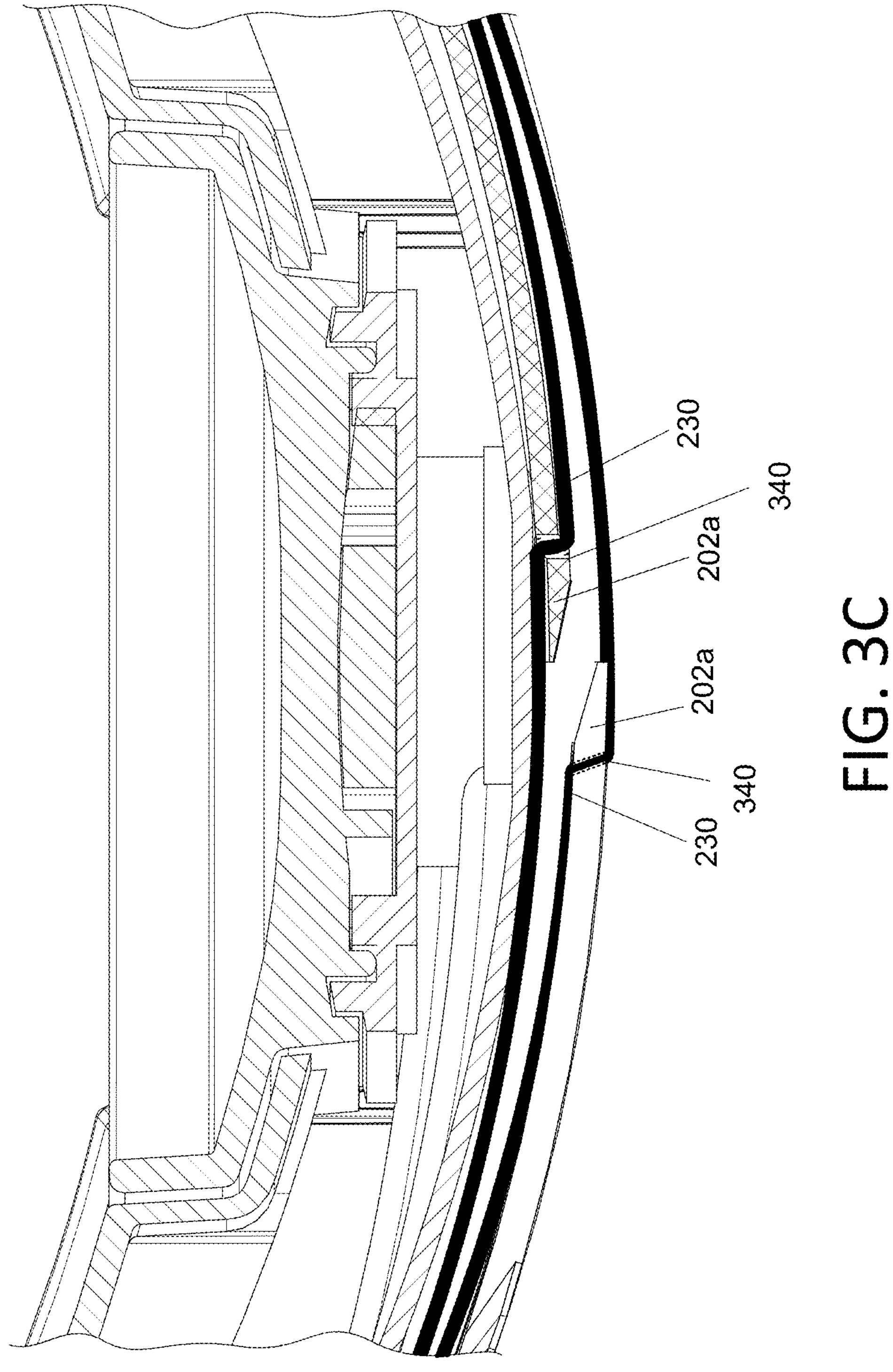

FIG. 3C illustrates a top view of the inside of the housing 106. When the adjustment mechanism 210 is actuated in a first direction, the cable 230 moves in a first direction through hole 342 such that the first tip portion 202*a* also moves in a first direction. Similarly, when the adjustment mechanism 210 is actuated in a first direction, the cable 230 moves in a second direction through hole 342 such that the second tip portion 202*b* also moves in a direction. As illustrated by FIG. 3C, the cable 230 goes through each tip portion 202*a* and 202*b* at an angle such that when the cable 230 is moved, the tip portions 202*a* and 202*b* are moved with the cable 230.

Figures 1, 3D:
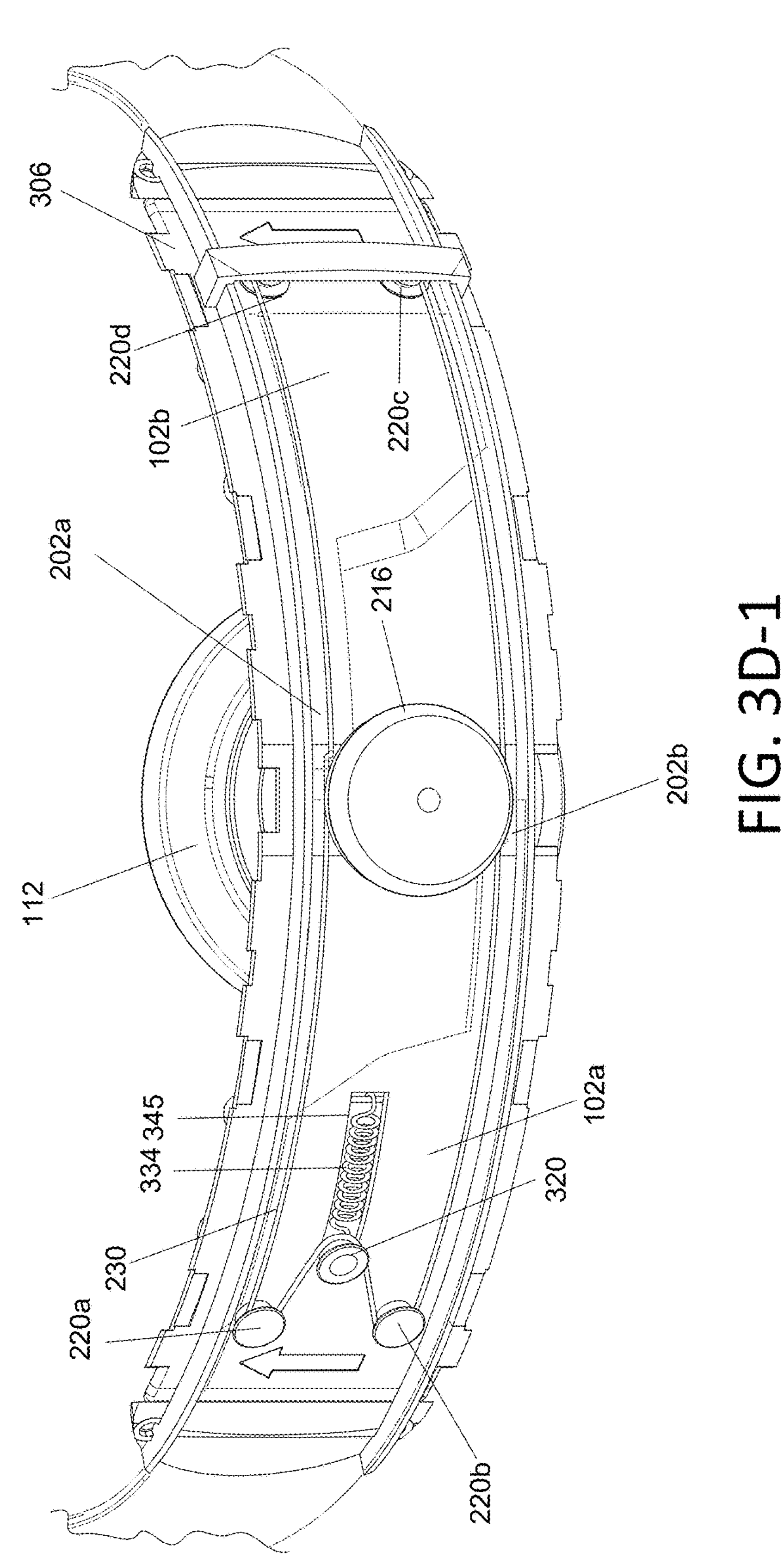
Figures 2, 3D:
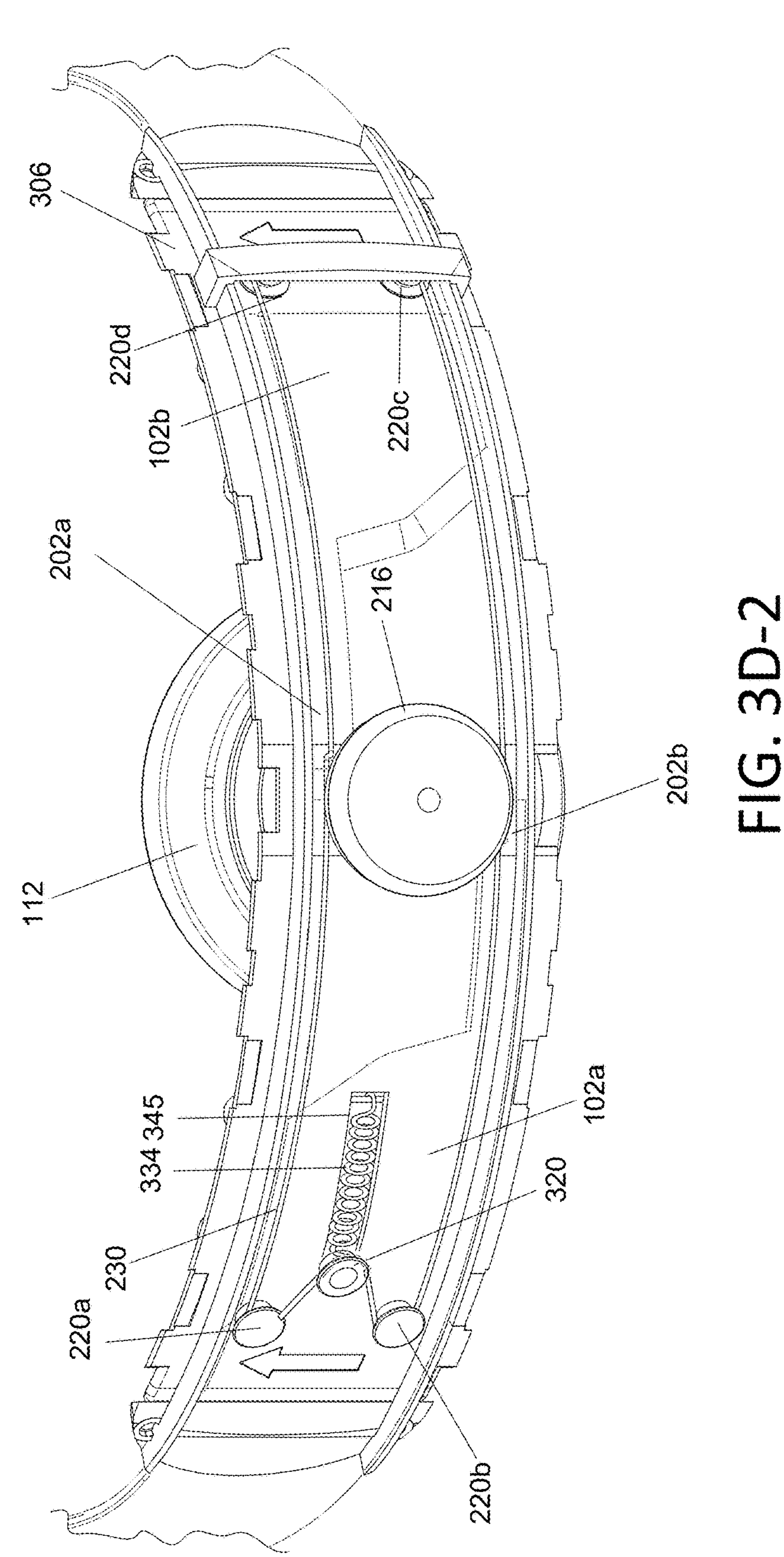

FIGS. 3D-1 and 3D-2 illustrate a housing including a spring element, in accordance with some embodiments. FIGS. 3D-1 and 3D-2 further illustrate, the housing 106 including a spring element 334 coupled to the cable 230 and/or a moving anchor point 320. In some embodiments, a backplate 306 includes an opening 345 for the spring element 334 such that the spring element 334 does not contact the retractable side strap 102 as discussed below. In some embodiments, the anchor point 320 is a moving pully, such that when the cable tension varies when the user 110 actuates the adjustment mechanism 210, the force applied by the spring element 334 on the moving anchor point 320 varies the tension on the cable 230 (e.g., maintaining the predetermined tension). In another embodiment, the adjustment mechanism 210 is coupled to a spring element 334 which maintains the cable 230 at a predetermined tension and in an additional embodiment, the spring element 334 is coupled to an anchor point 220 to maintain a predetermined tension on the cable.

FIG. 3D-1 illustrates the spring element 334 residing within opening 345 of the backplate 306 such that the retractable side strap 102 can easily travel over the spring element 334 while the retractable side strap 102 travels in between the first and second sides 104*a* and 104*b* of the housing 106. FIG. 3D-1 further illustrates the spring element 334 at a neutral position (e.g., at rest). Additionally, the opening 345 of the backplate 306 allows the spring element 334 to stretch or collapse based on the desired tension without obstructing the path for first end of retractable side strap 102*a*. The opening 345 of the backplate 306 also accommodates the anchor point 320, such that when the anchor point 320 moves to maintain tension on the cable 230, the anchor point 320 moves laterally inside the opening 345 of the backplate 206.

While FIG. 3D-1 illustrates the spring element 334 coupled to the backplate 206 on the first side 104*a* of the housing, the spring element 334 and the additional anchor point 320 can be integrated into the second side 104*b* of the housing 106 or an alternate part of the housing 106 (e.g., the adjustment mechanism 210). In some embodiments, the anchor point 320 has its own cut-out portion or opening within the backplate 306. In another embodiment, the anchor point 320 is positioned closer to the end of the first side of the housing 104*a* in between the anchor points 220*a* and 220*b* and the end of the first side 102*a* of the housing 106. When the user 110 actuates the adjustment mechanism 210, the cable 230 starts to wind/unwind around the cable-spool 212 of the adjustment mechanism and travel around multiple anchor points 220. While the cable 320 is moving, the tension on the cable 230 can constantly change. The spring element 334 coupled with the anchor point 320 is configured to maintain the predetermined tension by elongating or contracting to accommodate for the constantly changing tension. For example, FIG. 3D-2 illustrates a change in the spring element 334 and/or the anchor point 320 to account for a tension change in the cable 230.

Turning to FIG. 3D-2, the spring element 334 is shown in a stretched position due to a tension change in the cable 230. The spring element 334 can change (e.g., elongate or compress) to increase or decrease the tension in the cable 230 such that the predetermined tension is maintained (e.g., within a predefined range). Additionally or alternatively, in some embodiments, the anchor point 320 can be used to adjust the tension of the cable 230 such that the predetermined tension is maintained. For example, the anchor point 320 can be a moving pully such that when the tension in the cable 230 changes the anchor point 230 can move (e.g., rotate, slide, move laterally, etc.) to maintained the predetermined tension. In some embodiments, only the spring element 334 elongates or collapse to maintain the predetermined tension. In some embodiments, only the anchor point 320 is adjusted to maintain the predetermined tension. In some embodiments, both the spring element 334 and the anchor point 320 are adjusted to maintain the predetermined tension.

FIG. 4A illustrates the head-wearable device with the retractable side strap fully extended, in accordance with some embodiments. In particular, FIG. 4A shows the head-wearable device 100 with the exposed portion of the retractable side strap 102 positioned at its longest position (e.g., maximum length). In some embodiments, when the exposed portion of the retractable side strap 102 is at its longest length, the first tip portion 202*b* of the first end 102*a* of the retractable side strap is adjacent to the end of the first end 104*a* of the housing and the second tip portion 202*a* of the second end of the retractable side strap is adjacent to the end of the second end 104*b* of the housing. More specifically, the first tip portion 202*b* of the first end 102*a* of the retractable side strap is adjacent to an anchor point 220*b* at the first end 104*a* of the housing and the second tip portion 202*a* of the second end of the retractable side strap is adjacent to an anchor point 220*d* at the second end 104*b* of the housing. Additionally, the first tip portion 202*b* of the first end of the retractable side strap 102 and the second tip portion 202*a* of the second end 102*b* of the retractable side strap remain inside of the housing 106. Thus, the first tip portion 202*b* of the first end 102*a* of the retractable side strap cannot move any further toward the first side 104*a* of the housing, and the second tip portion 202*a* of the second end 102*b* of the retractable side strap cannot move any further toward the second side 104*b* of the housing.

In some embodiments, the anchor points 220 are positioned such that they are within 7-10% of the edge of the housing such that the ends of the retractable side straps 102 can travel 75-90% of the length of the housing 106. For example, as shown in FIG. 4A, the anchor points 220*a* and 220*b* on the first side of the housing 104*a* are positioned such that the first end of the retractable side strap 102*a* is as close to the first side of the housing 104*a* as possible when the exposed portion of the retractable side strap 102 is at its longest position. Additionally, the anchor points 220*c* and 220*d* are positioned as close to the second side of the housing 104*b* as possible such that when the first end of the retractable side strap 102*a* travels from the first side of the housing 104*a* to the second side of the housing 104*b*, the first end of the retractable side strap 102*a* travels a maximum distance from the first side of the housing 104*a* to the second side of the housing 104*b*. This allows the retractable strap 102*a* and 102*b* to travel a maximum (e.g., 240 mm) inside of the housing 106 allowing the user 110 to have the widest range possible for different head sizes. Furthermore, because the anchor points 220*a-d* are positioned close to the sides of the housing 104*a* and 104*b*, when the second end of the retractable side strap 102*b* travels from second side of the housing 104*b* to the first side of the housing 104*a*, the second end 102*b* of the retractable side strap is also able to travel a maximum distance though the housing 106.

Additionally, when the retractable side straps 102 is at its longest length, the adjustment mechanism 210 can only be actuated to decrease the length of the exposed length of the retractable side strap 102 (e.g., the adjustment mechanism 210 can only be actuated in the first direction). In other words, when the exposed portion of the retractable side strap 102 is at its longest length, the first end 102*a* of the retractable side strap can only move towards the second side 104*b* of the housing 106 and the second end 102*b* of the retractable side strap can only move towards the first side 104*a* of the housing 106. Furthermore, while the exposed portion of the retractable side strap 102 is at its longest length, the adjustment mechanism 210 cannot be actuated in the second direction (used to increase the length of the exposed retractable side strap). In some embodiments, while the retractable side strap 102 is at its maximum length, attempts to further increase the length of the retractable side strap 102, via the adjustment mechanism 210, cause the adjustment mechanism 210 to spin freely (e.g., without causing the cable-spool 212 to rotate) or cause the adjustment mechanism 210 maintain its current position and prohibit the user 110 from rotating the adjustment mechanism in the second direction (e.g., counter-clockwise), such that the adjustment mechanism 210 can only move in a first direction (e.g., clockwise)).

When the exposed length of the retractable side strap 102 is at its longest length, the first windable segment 432 of the cable 230 has a first length of cable 230 wound around the first cable-spooling portion 510 of the adjustment mechanism 210 and the second windable segment 434 of the cable has a second length of cable wound around the second cable-spooling portion 520 of the adjustment mechanism, the second length being less than the first length. In other words, the first windable segment 432 of the cable 230 is the length of cable that can wind around the first cable-spooling portion 510 and the second windable segment 434 of the cable 230 is the length of cable that can wind around the second cable-spooling portion 520. When the exposed portion of the retractable side strap 102 is at its longest length (e.g., maximum length), a maximum length (e.g., 75-90% of the total cable) of the first windable segment 432 will be wound around the first cable-spooling portion 510, and a minimum length (e.g., 5-15% of the total cable) of the total cable) of the second windable segment 434 will be wound around the second cable-spooling portion 520. In some embodiments, the cable 230 winds on top of each other when a maximum amount of cable 230 is wrapped around the first or second cable-spooling portion 212. In other embodiments, the cable 230 does not wrap on top of each other, but instead when the cable 230 is winding up on the first or second cable-spooling portion 212 each wrap of the cable 230 is placed next to the previous wrap of cable 230 creating a single layer of cable 230 on the cable-spooling portion 212. As shown in FIG. 4A, the cable 230 is wound in a way such that the cable 230 wraps wind next to the previous wrap instead of on top of previous wraps.

In some embodiments, when the adjustment mechanism 210 is actuated in a first direction (e.g., clockwise), the first tip portion 202*b* of the retractable side strap travels towards the second end of the housing 104*b* and the second tip portion 202*a* of the retractable side strap travels towards the first end of the housing 104*a*. As discussed above in FIG. 3D, the movement of the cable 230 also moves the ends of the retractable side strap 102*a* and 102*b*. In some embodiments, when the user 110 adjusts the handwheel 112 on the adjustment mechanism 210, the cable 230 starts to wind around the second cable-spooling portion 520 and unwind around the first cable-spooling portion 510. Thus, the cable 230 starts to move in the first direction (clockwise) ultimately pulling the two ends of the retractable side strap 102 together. Furthermore, when the adjustment mechanism 210 is actuated in a first direction (e.g., clockwise), the intermediary portion 430*c* of the cable 230 moves around the anchor point 220*d* such that the first end 102*a* of the retractable side strap moves towards the second end 104*b* of the housing and the second end 102*b* of the retractable side strap moves toward the first end 104*a* of the housing, causing the length of the exposed portion of the retractable side strap 102 to decrease. In other words, the further the ends 102*a* and 102*b* of the retractable side strap 102 travel inside of the housing, the shorter the length of the exposed retractable side strap 102.

When the cable 230 starts to wind and unwind around respective portions of the cable-spooling portions 212 of the adjustment mechanism 210, the cable 230 travels throughout the housing 106 around one or more anchor points 220. FIG. 4A further illustrates intermediary portions of the cable 230 traveling in different directions due to the cable 230 traveling around one or more anchor points 220. For example, as shown in FIG. 4A, when an intermediary portion 430*c* of cable 230 exits the adjustment mechanism 210, it is traveling in a first direction toward the first end 104*a* of the housing. When the intermediary portion 430*c* travels around anchor point 220*b*, the cable 230 changes direction and is now traveling in a second direction toward the second end 104*b* of the housing. A first tip portion 202*b* of the retractable side strap is coupled to an intermediary portion 430*b* of the cable such that when the adjustment mechanism 210 is actuated in a first direction, the tip portion 202*b* of the retractable side strap moves toward the second end 104*b* of the housing.

FIG. 4B illustrates the head-wearable device at a second point in time in which the respective exposed length of the retractable side strap is decreased, in accordance with some embodiments. In particular, FIG. 4B illustrates the head-wearable device 100 with the retractable side strap 102 positioned at an intermediary position or an intermediary length. As described above, the user 110 can actuate the adjustment mechanism 210 to adjust an exposed length of the retractable side strap 102. In FIG. 4B, the tip portion 202*b* of the first end 102*a* of the retractable side strap moved toward the second side 104*b* of the housing 106. In particular, as the user 110 adjusts the adjustment mechanism 210 in the first direction, the cable-spooling 212 portion of the adjustment mechanism is rotated, spooling cable 230 onto the second portion of the cable-spooling portion 520 of the adjustment mechanism and unspooling cable from the first cable-spooling portion 510 of the adjustment mechanism, moving the cable 230 in a first direction such that the first and second tip portions 202*a* and 202*b* of the retractable side strap are pulled together. As a result, as illustrated in FIG. 4B, the first and second tip portions 202*a* and 202*b* of the retractable side strap are positioned adjacent to the cap 216 and the exposed portion of the retractable side strap (e.g., the portion of the retractable side strap outside of the housing 106) is decreased.

In some embodiments, the first and second ends of the retractable side strap 102 are moved in unison. For example, as shown in FIG. 4B, the first and second ends of the retractable side straps move in unison such that the tip portions of the ends of the retractable side strap are adjacent to the cap 216 on the adjustment mechanism 210.

FIG. 4C illustrates the head-wearable device at a third point in time in which the respective exposed length of the retractable side strap is decreased to its shortest length (e.g., a minimum length), in accordance with some embodiments. In particular, FIG. 4C shows the head-wearable device 100 with the first and second ends of the retractable side strap 102*a* and 102*b* positioned at their fully retracted positions (e.g., shortest/minimum length). When the exposed portion of the retractable side strap 102 is at its shortest exposed length, the head-wearable device 100 is at its smallest size (e.g., to accommodate small head sizes). When the retractable side strap 102 is in its fully retracted position, the tip portion 202*b* of the first end 102*a* of the retractable side strap is positioned adjacent to an anchor point 220*c* on the second side 104*b* of the housing, and the tip portion 202*a* of the second end 102*b* of the retractable side strap is positioned adjacent to an anchor point 220*a* (below the first end of the retractable side strap). Additionally, the anchor points 220 are positioned such that the first tip portion 202*b* of the first end 102*a* of the retractable side strap cannot move any further toward the second side 104*b* of the housing, and the second tip portion 202*a* of the second end 102*b* of the retractable side strap cannot move any further toward the first side 104*a* of the housing.

Additionally, when the retractable side straps 102 is at its minimum length, the adjustment mechanism 210 can only be actuated to increase the length of the exposed length of the retractable side strap 102 (e.g., the adjustment mechanism 210 can only be actuated in the second direction). In other words, when the retractable side strap 102 is at its shortest length, the first end 102*a* of the retractable side strap can only move towards the first side 104*a* of the housing 106 and the second end 102*b* of the retractable side strap can only move towards the second side 104*b* of the housing 106. Furthermore, while the retractable side strap 102 is at its shortest length, the adjustment mechanism 210 cannot be actuated in the first direction (used to decrease the length of the exposed retractable side strap). In some embodiments, while the retractable side strap 102 is at its maximum length, attempts to further decrease the length of the retractable side strap 102, via the adjustment mechanism 210, cause the adjustment mechanism 210 to spin freely (e.g., without causing the cable-spooling portion 212 to rotate) or cause the adjustment mechanism 210 maintain its current position and prohibit the user 110 from rotating the adjustment mechanism in the first direction (e.g., clockwise), such that the adjustment mechanism 210 can only move in a second direction (e.g., counterclockwise)).

When the exposed length of the retractable side strap 102 is at its shortest length, the first windable segment 432 of the cable 230 has a first length of cable wound around the first cable-spooling portion 510 of the adjustment mechanism 210 and the second windable segment 434 of the cable has a second length of cable wound around the second cable-spooling portion 520 of the adjustment mechanism, the second length being larger than the first length. When the exposed portion of the retractable side strap 102 is at its shortest length (e.g., minimum length), a minimum length of the first windable segment 432 will be wound around the first cable-spooling portion 510, and a maximum length of the second windable segment 434 will be wound around the second cable-spooling portion 520.

In some embodiments, the retractable side strap is positioned in its fully retracted position (e.g., the exposed length of the retractable side strap 102 is at its shortest), the user 110 can adjust the adjustment mechanism to make the retractable side strap 102 longer to fit a larger head size. In some embodiments, when the adjustment mechanism 210 is actuated in a second direction (e.g., counterclockwise), the first tip portion 202*b* of the retractable side strap travels towards the first end of the housing 104*a* and the second tip portion 202*a* of the retractable side strap travels towards the second end of the housing 104*b*. In some embodiments, when the user 110 adjusts the handwheel 112 on the adjustment mechanism 210, the cable 230 starts to wind around the first cable-spooling portion 510 and unwind around the second cable-spooling portion 520. Thus, the cable 230 starts to move in the second direction (e.g., counterclockwise) ultimately spreading the two ends of the retractable side strap 102 apart. Furthermore, when the adjustment mechanism 210 is actuated in a second direction (e.g., clockwise), the intermediary portion 430*c* of the cable 230 moves around the anchor point 220*d* such that the first end 102*a* of the retractable side strap moves towards the first end 104*a* of the housing and the second end 102*b* of the retractable side strap moves toward the second end 104*b* of the housing, causing the length of the exposed portion of the retractable side strap 102 to increase.

The above examples are non-limiting. Different configurations for spooling and unspooling the cable-spool 212 are also contemplated. For example, the cable-spool 212 can include more than one drum, the first cable-spooling portion 510 and the second cable-spooling portion 520 can unwind at the same or distinct rates, etc.

Figures 1, 5A:
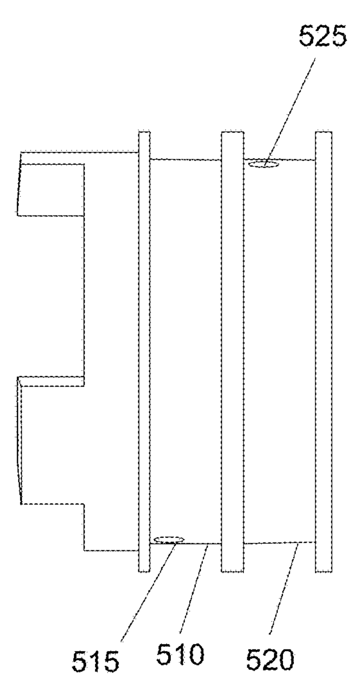
Figures 2, 5A:
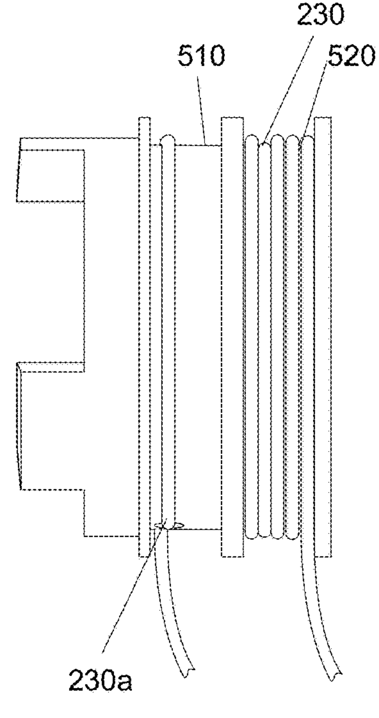
Figures 3, 5A:
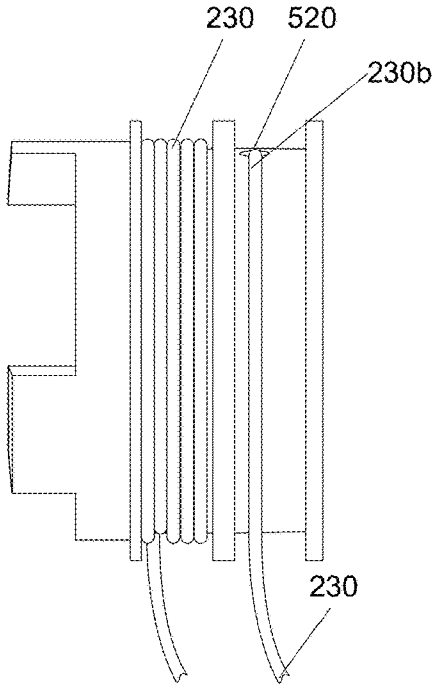
Figures 4, 5A:
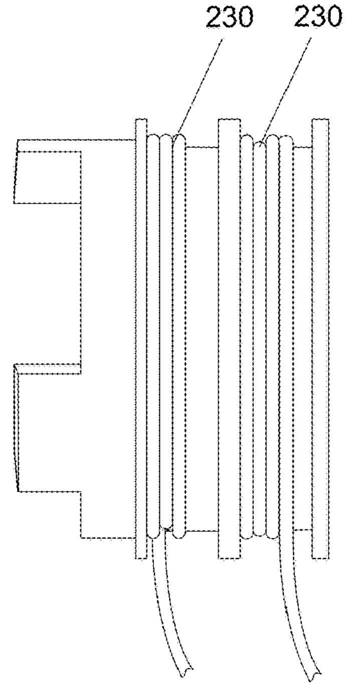

FIG. 5A1-5C illustrates example cable-spool embodiments, in accordance with some embodiments. FIG. 5A-1 illustrates the cable-spool 212 including a first cable-spooling portion 510 with a first hole 515 and a second cable-spooling portion 520 with a second hole 525 configured to couple to the cable 230 to the cable-spool 212. In some embodiments, the width of the first 510 and second 520 cable-spooling portions is designed to accommodate the cable 230 wrapping around the cable-spooling portion 212 in only one layer, and in other embodiments the first 510 and second 520 cable-spooling portions are wide enough to accommodate the cable wrapping around the cable-spooling portion 212 and back onto itself. This is further discussed below in FIGS. 5A-2-5C. In some embodiments when the cable-spool 212 has a double drum, the first drum can rotate in a first direction and the second drum can rotate in a second direction distinct from the first when the adjustment mechanism 212 is actuated. In some embodiments, the cable-spool 212 is coupled to a cap 216 configured to contain the cable 230 inside of the adjustment mechanism as it wraps around the cable-spool 212. In some embodiments, there is no cap 216 coupled to the cable-spooling portion 212 as shown in FIGS. 5A-1-5A-4. However, in some embodiments the cable-spooling portion includes one or more caps as shown in FIGS. 5B-1-5B-4.

In some embodiments, the first cable-spooling portion 510 of the adjustment mechanism includes a first radius and the second cable-spooling portion 520 includes a second radius. In some embodiments the first and second radius are the same and in other embodiments they are distinct. For example, if the cable-spool 212 of the adjustment mechanism is a cylinder as shown in FIGS. 2 and 5A-1-5C, the first and second radii are the same. For embodiments in which the first radius is distinct from the second radius, the radii are selected to ensure that once the cable 230 is spooled onto the cable-spooling portion of the adjustment mechanism, there is sufficient clearance between the cable-spool 212 of the adjustment mechanism from interior portions of the housing 106. Furthermore, the radii are selected such that the spooled cable maintains a separation gap from either a top part of the housing 106 that includes the retractable strap 102 or a cover that is on top of the adjustment mechanism 210. This gap protects the cable 230 from contacting parts of the housing or other parts of the adjustment mechanism 210 that could substantially damage the cable 230 or create additional friction in the system making it difficult for the user 110 to actuate the adjustment mechanism 210 and subject the cable 230 to additional wear. For embodiments in which the first and second and cable-spooling portions 510 and 520 are non-circular (such as an elliptical shape), the radius of the cable-spool 212 can be the radius measured along the semi-major axis.

FIG. 5A-2 illustrates the cable-spooling portion 212 when the retractable strap 102 is at its shortest exposed length (e.g., similar to FIG. 4C) such that a maximum amount of cable 230 is wound around the second cable-spooling portion 520. FIG. 5A-2 also illustrates the second cable-spooling portion 520 configured to allow the cable 230 to wind around the second cable-spooling portion 520 without winding on top of previously wound cable. In other words, there is only one layer of spooled cable on the second cable-spooling portion 520. In other embodiments, when more cable 230 is required, the first 510 and second 520 portions of the cable-spooling mechanism can be configured to accommodate additional cable by being wider. FIG. 5A-2 further illustrates the first end 230*a* of the cable coupled to the first hole 515 in the first cable-spooling portion 510.

FIG. 5A-2 further illustrates a second cable-spooling portion 520 with a maximum amount of cable 230 wound around it, and a first cable-spooling portion 510 with a minimum amount of cable 230 would around it, such that the radius of the second cable-spooling portion 520 including the spooled cable 230 is larger than the radius of the first cable-spooling portion 510 including the spooled cable 230. The disparity in the first and second radius creates a variance in the amount of cable unspooled from the second cable-spooling portion 520 of the adjustment mechanism and the amount of cable spooled from the first cable-spooling portion 510 of the adjustment mechanism. When the adjustment mechanism 210 is actuated, the second cable-spooling portion 520 will unspool more cable 230 than the first cable-spooling portion 510 can take up because of the difference in radius size. The tensioning system adjusts to accommodate situations like this where the length of cable spooled versus unspooled is uneven and can materially affect the tension in the system. Furthermore, as the cable 230 is used it will experience additional wear and tear and especially has the possibility of stretching out. Thus, as the tensioning system also plays a critical role in maintaining the tension as the cable 230 gets older and longer.

FIG. 5A-3 illustrates the cable-spooling portion 212 when the retractable side strap 102 is at its longest exposed length (e.g., similar to FIG. 4A) such that a maximum amount of cable 230 is wound around the first cable-spooling portion 510 and a minimum amount of cable 230 is wound around the second cable-spooling portion 520. FIG. 5A-3 further illustrates the second end 230*b* of the cable coupled to the second cable-spooling portion 510 via the second hole 525.

FIG. 5A-4 illustrates the cable-spooling portion 212 at a second point in time in which the cable-spooling portions 212 have an intermediary amount of cable 230 wound on each portion. FIG. 5A-4 further illustrates the cable-spooling portions 212 have about half of the maximum allowed cable spooled on each portion. The cable-spooling portion 212 would be most similar to the cable-spooling portion in FIG. 4B.

Figures 1, 5B:
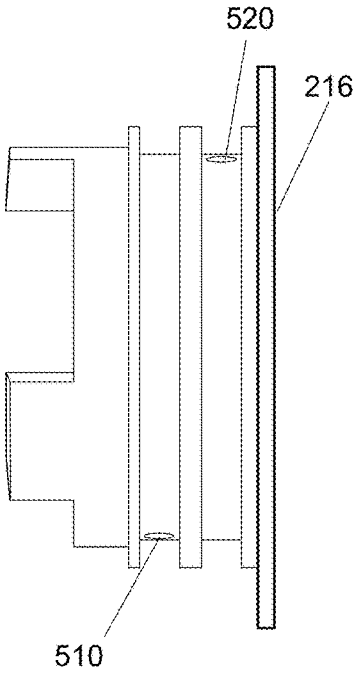
Figures 2, 5B:
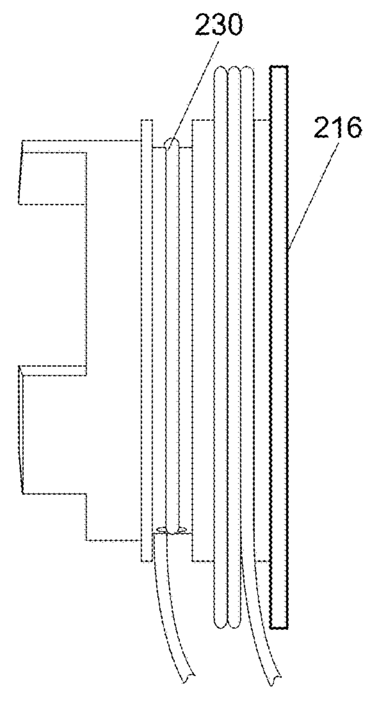
Figures 3, 5B:
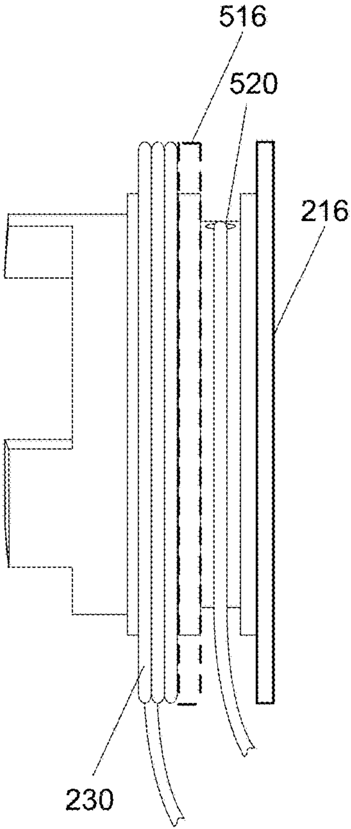
Figures 4, 5B:
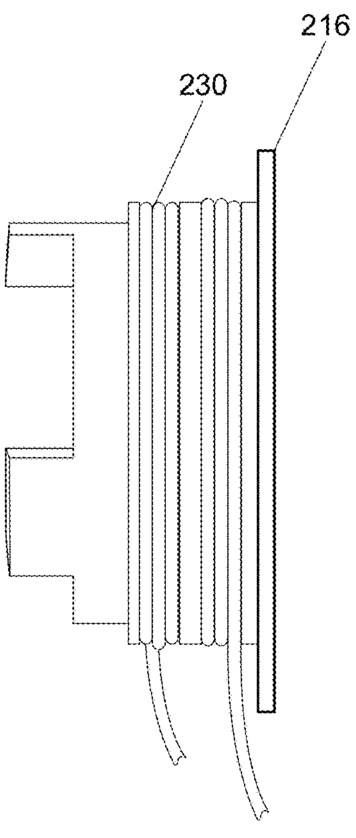

FIG. 5B-1 illustrates the cable-spooling portion 212 without cable 230 spooled onto it. Furthermore, FIG. 5B-1 illustrates the cable-spooling portion 212 coupled to a cap 216 to contain the cable 230 to the adjustment mechanism 210 as discussed above. Furthermore, the cable-spooling portions 510 and 520 are much narrower than previously shown. In some embodiments, the cable-spooling portions 510 and 520 can be narrower and thus allow the cable 230 to wind around the cable-spooling portion 212 and on top of the previously wound cable 230. In other words, the cable 230 can wind on top of each other as needed.

FIG. 5B-2 illustrates the cable-spooling portion 212 when the retractable strap 102 is at its shortest exposed length (e.g., similar to FIG. 4C) such that a maximum amount of cable 230 is wound around the second cable-spooling portion 520. Furthermore, the cable 230 wound on the second cable-spooling portion 230 is wound on top of each other in order to accommodate for the extra cable 230. Additionally, the cable 230 is only wound as high as the cap 216 in order to keep the cable 230 contained inside of the adjustment mechanism 210.

FIG. 5B-3 illustrates the cable-spooling portion 212 when the retractable side strap 102 is at its longest exposed length (e.g., similar to FIG. 4A) such that a maximum amount of cable 230 is would around the first cable-spooling portion 510 and a minimum amount of cable 230 is wound around the second cable-spooling portion 520. FIG. 5A-7 further illustrates another cap 516 coupled to the first cable-spooling portion 510 configured to contain the cable 230 onto the first cable-spooling portion 510. Additionally, the cap 516 allows the cable 230 to wind on top of previously wound cable 230 higher which increases the capacity of cable 230 the first cable-spooling portion 510 can accommodate.

FIG. 5B-4 illustrates the cable-spooling portion 212 at a second point in time in which the cable-spooling portions 212 have an intermediary amount of cable 230 wound on each portion. FIG. 5B-4 further illustrates the cable 230 fully covering the available space directly on the cable-spooling portion 212, but allows for further cable 230 spooled on top of either the first or second cable-spooling portions 510 and 520. For example, if the adjustment mechanism 210 was actuated in the first direction (e.g., clockwise), the cable 230 would start unspooling from the first cable-spooling portion 510 of the adjustment mechanism and spooling onto the second cable-spooling portion 520 of the adjustment mechanism on top of the already spooled cable 230 and could wind as tall as the cap 216 coupled to the second cable-spooling portion 520 of the adjustment mechanism.

Figure 5C:
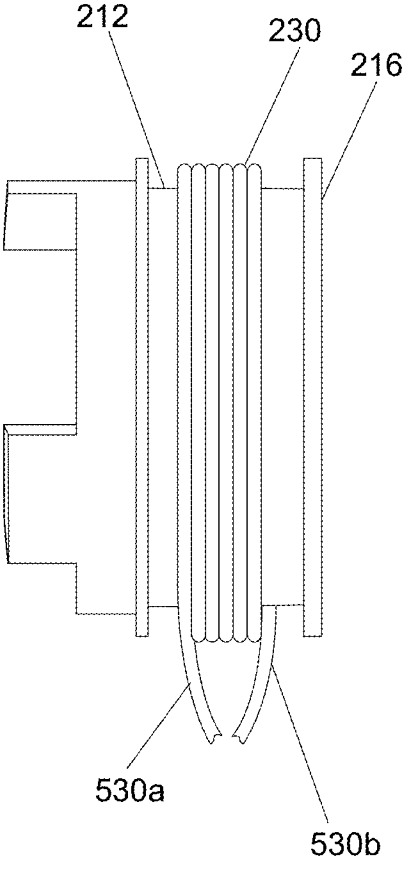

FIG. 5C illustrates a single drum cable-spooling portion of the adjustment mechanism. In some embodiments, the cable 230 is coupled to the cable-spool 212 of the adjustment mechanism using friction by wrapping the cable 230 at least once around a first portion of the cable-spool 212 of the adjustment mechanism, overlapping the end of the cable 230 keeping the cable 230 securely coupled to the first cable-spooling portion 510 of the adjustment mechanism. Additionally, the cable 230 is wrapped around the cable-spooling portion of the adjustment mechanism in a single piece such that friction is what is coupling the cable to the cable-spooling portion 212.

In some embodiments, when the adjustment mechanism 210 is adjusted by the user 110 in a first direction, the first intermediary portion 530*a* of the cable will unspool from the cable-spooling portion 212 of the adjustment mechanism and the second intermediary portion 530*b* of the cable will spool up on cable-spooling portion 212 of the adjustment mechanism. In some embodiments, the cable 230 does not wind on top of each other, but will wind next to previously would cable 230 instead as shown in FIG. 5A-1-5C. In some embodiments, when friction is used to couple the cable 230 to the adjustment mechanism 212, a predetermined tension must be maintained on the cable 230 to keep the cable 230 from slipping on the cable-spooling portion 212. Methods for maintaining a predetermined tension on the cable 230 are discussed above in FIGS. 2 and 3A.

The above examples are non-limiting. For example, the cable-spool 212 can be configured such that the when the retractable side strap 102 is at its longest exposed length (e.g., similar to FIG. 4A) a minimum amount of cable 230 is wound around the first cable-spooling portion 510 and a maximum amount of cable 230 is wound around the second cable-spooling portion 520.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 605, a head-wearable device, an HIPD 607, a smart textile-based garment (not shown), or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

Figure 6A:
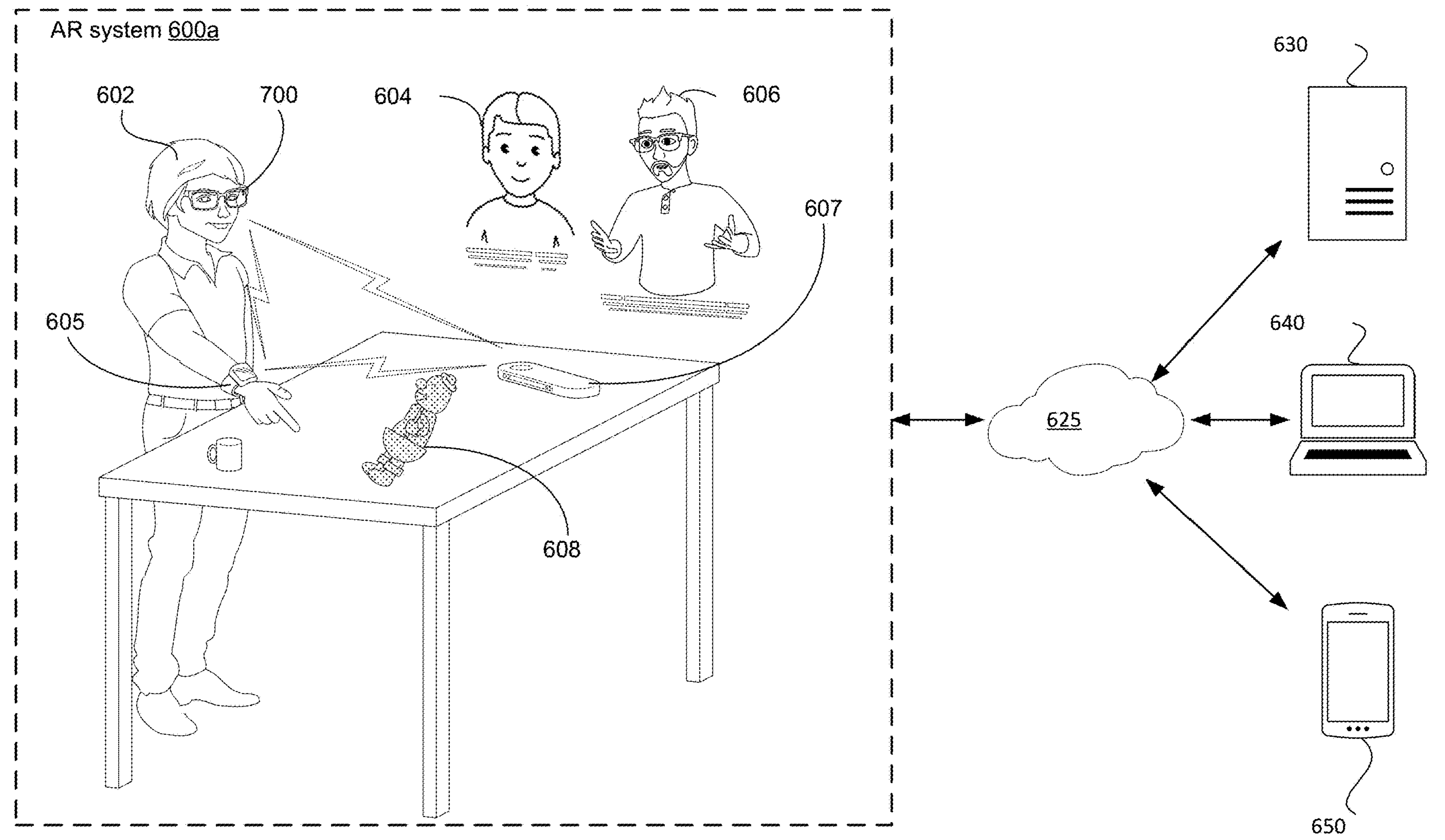
Figure 6B:
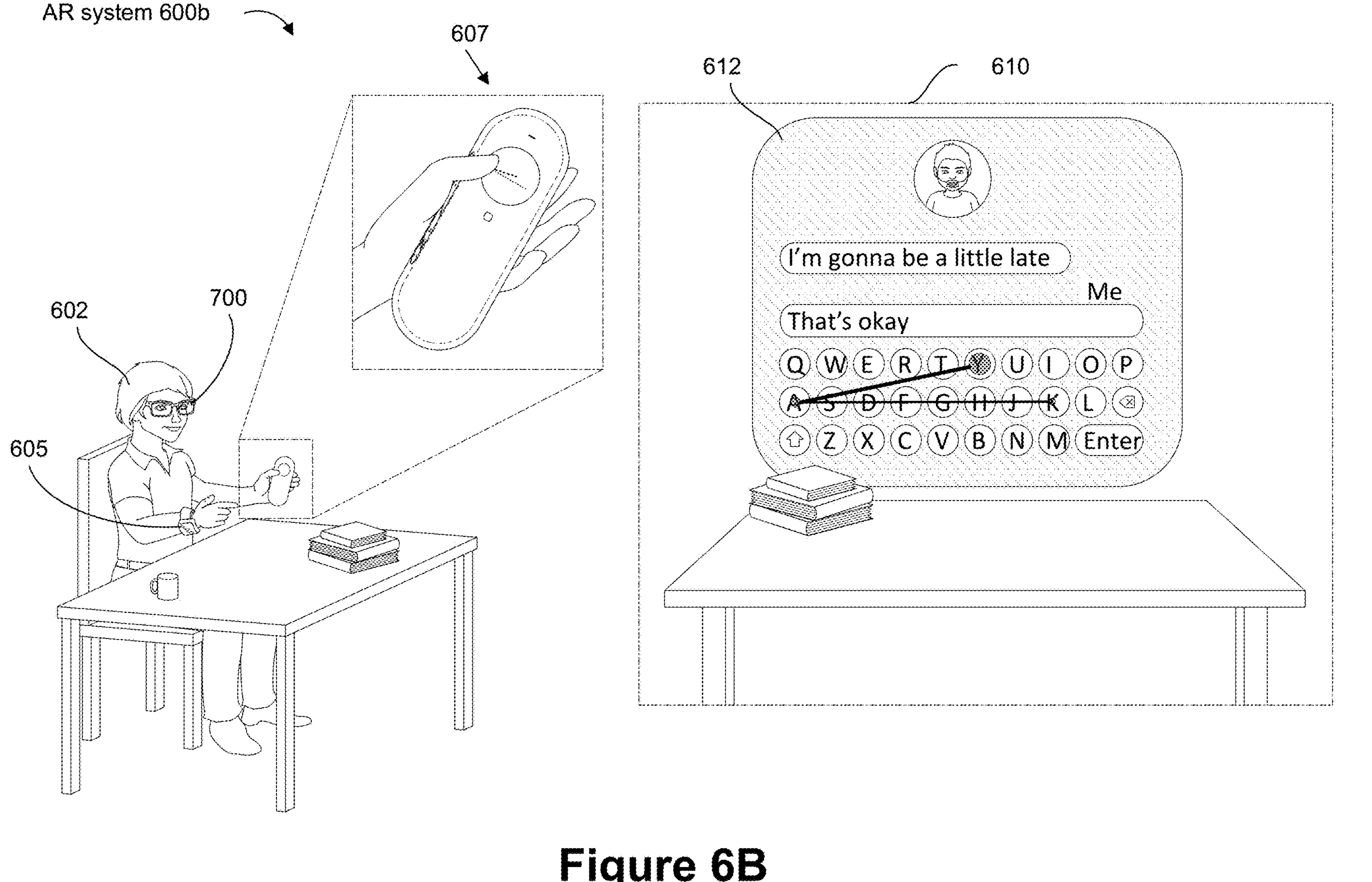
Figures 1, 6C:
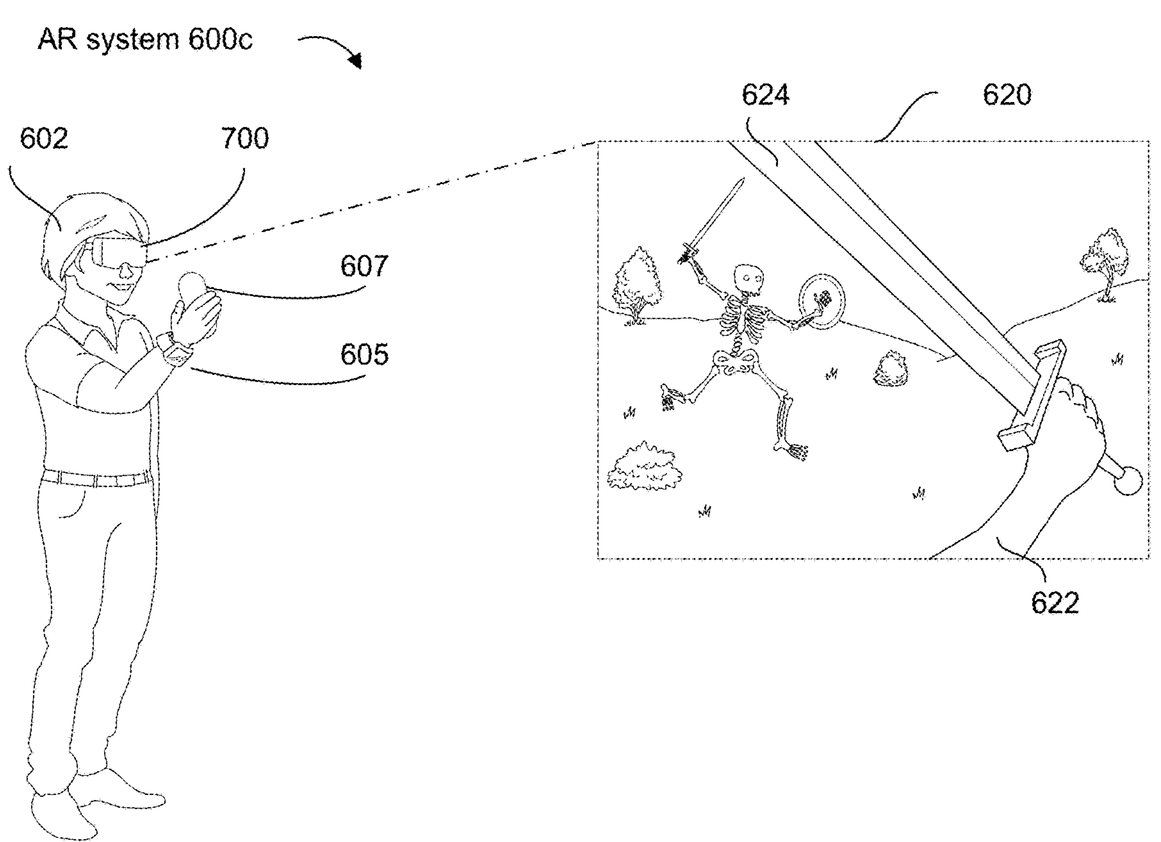
Figures 2, 6C:
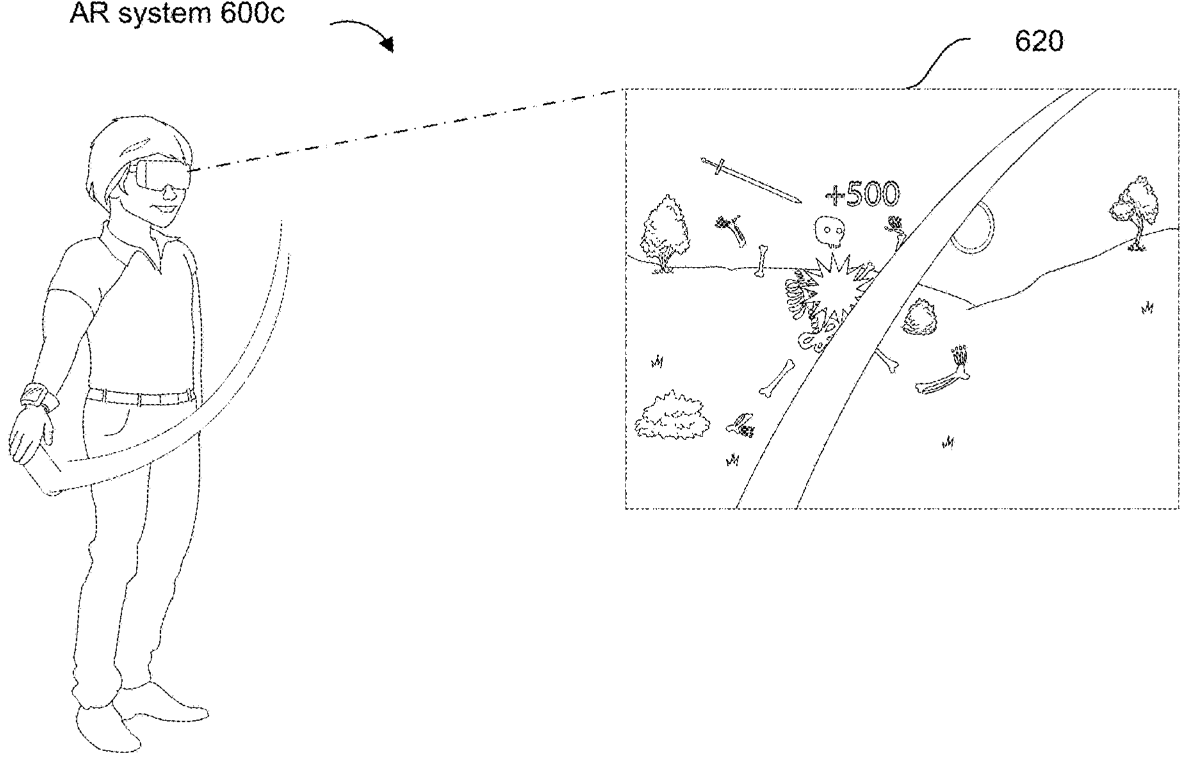

FIGS. 6A-6C-2 illustrate example artificial-reality systems, in accordance with some embodiments. FIG. 6A shows a first AR system 600*a* and first example user interactions using a wrist-wearable device 605, a head-wearable device (e.g., AR device 700), and/or a handheld intermediary processing device (HIPD) 607. FIG. 6B shows a second AR system 600*b* and second example user interactions using a wrist-wearable device 605, AR device 700, and/or an HIPD 607. FIGS. 6C-1 and 6C-2 show a third AR system 600*c* and third example user interactions using a wrist-wearable device 605, a head-wearable device (e.g., virtual-reality (VR) device 710), and/or an HIPD 607. As the skilled artisan will appreciate upon reading the descriptions provided herein, the above-example AR systems (described in detail below) can perform various functions and/or operations in an AR environment.

The head-wearable devices and their constituent components are described below in reference to FIGS. 7A-7D. The wrist-wearable device 605, the head-wearable devices, and/or the HIPD 607 can communicatively couple via a network 625 (e.g., cellular, near field, Wi-Fi, personal area network, wireless LAN, etc.). Additionally, the wrist-wearable device 605, the head-wearable devices, and/or the HIPD 607 can also communicatively couple with one or more servers 630, computers 640 (e.g., laptops, computers, etc.), mobile devices 650 (e.g., smartphones, tablets, etc.), and/or other electronic devices via the network 625 (e.g., cellular, near field, Wi-Fi, personal area network, wireless LAN, etc.).

Turning to FIG. 6A, a user 602 is shown wearing the wrist-wearable device 605 and the AR device 700, and having the HIPD 607 on their desk. The wrist-wearable device 605, the AR device 700, and the HIPD 607 facilitate user interaction with an AR environment. In particular, as shown by the first AR system 600*a*, the wrist-wearable device 605, the AR device 700, and/or the HIPD 607 cause presentation of one or more avatars 604, digital representations of contacts 606, and virtual objects 608. As discussed below, the user 602 can interact with the one or more avatars 604, digital representations of the contacts 606, and virtual objects 608 via the wrist-wearable device 605, the AR device 700, and/or the HIPD 607.

The user 602 can use any of the wrist-wearable device 605, the AR device 700, and/or the HIPD 607 to provide user inputs. For example, the user 602 can perform one or more hand gestures that are detected by the wrist-wearable device 605 (e.g., using one or more EMG sensors and/or IMUs) and/or AR device 700 (e.g., using one or more image sensors or cameras, described below in reference to FIGS. 7A-7B) to provide a user input. Alternatively, or additionally, the user 602 can provide a user input via one or more touch surfaces of the wrist-wearable device 605, the AR device 700, and/or the HIPD 607, and/or voice commands captured by a microphone of the wrist-wearable device 605, the AR device 700, and/or the HIPD 607. In some embodiments, the wrist-wearable device 605, the AR device 700, and/or the HIPD 607 include a digital assistant to help the user in providing a user input (e.g., completing a sequence of operations, suggesting different operations or commands, providing reminders, confirming a command). In some embodiments, the user 602 can provide a user input via one or more facial gestures and/or facial expressions. For example, cameras of the wrist-wearable device 605, the AR device 700, and/or the HIPD 607 can track the user 602's eyes for navigating a user interface.

The wrist-wearable device 605, the AR device 700, and/or the HIPD 607 can operate alone or in conjunction to allow the user 602 to interact with the AR environment. In some embodiments, the HIPD 607 is configured to operate as a central hub or control center for the wrist-wearable device 605, the AR device 700, and/or another communicatively coupled device. For example, the user 602 can provide an input to interact with the AR environment at any of the wrist-wearable device 605, the AR device 700, and/or the HIPD 607, and the HIPD 607 can identify one or more back-end and front-end tasks to cause the performance of the requested interaction and distribute instructions to cause the performance of the one or more back-end and front-end tasks at the wrist-wearable device 605, the AR device 700, and/or the HIPD 607. In some embodiments, a back-end task is a background-processing task that is not perceptible by the user (e.g., rendering content, decompression, compression, etc.), and a front-end task is a user-facing task that is perceptible to the user (e.g., presenting information to the user, providing feedback to the user, etc.)). The HIPD 607 can perform the back-end tasks and provide the wrist-wearable device 605 and/or the AR device 700 operational data corresponding to the performed back-end tasks such that the wrist-wearable device 605 and/or the AR device 700 can perform the front-end tasks. In this way, the HIPD 607, which has more computational resources and greater thermal headroom than the wrist-wearable device 605 and/or the AR device 700, performs computationally intensive tasks and reduces the computer resource utilization and/or power usage of the wrist-wearable device 605 and/or the AR device 700.

In the example shown by the first AR system 600*a*, the HIPD 607 identifies one or more back-end tasks and front-end tasks associated with a user request to initiate an AR video call with one or more other users (represented by the avatar 604 and the digital representation of the contact 606) and distributes instructions to cause the performance of the one or more back-end tasks and front-end tasks. In particular, the HIPD 607 performs back-end tasks for processing and/or rendering image data (and other data) associated with the AR video call and provides operational data associated with the performed back-end tasks to the AR device 700 such that the AR device 700 performs front-end tasks for presenting the AR video call (e.g., presenting the avatar 604 and the digital representation of the contact 606).

In some embodiments, the HIPD 607 can operate as a focal or anchor point for causing the presentation of information. This allows the user 602 to be generally aware of where information is presented. For example, as shown in the first AR system 600*a*, the avatar 604 and the digital representation of the contact 606 are presented above the HIPD 607. In particular, the HIPD 607 and the AR device 700 operate in conjunction to determine a location for presenting the avatar 604 and the digital representation of the contact 606. In some embodiments, information can be presented within a predetermined distance from the HIPD 607 (e.g., within five meters). For example, as shown in the first AR system 600*a*, virtual object 608 is presented on the desk some distance from the HIPD 607. Similar to the above example, the HIPD 607 and the AR device 700 can operate in conjunction to determine a location for presenting the virtual object 608. Alternatively, in some embodiments, presentation of information is not bound by the HIPD 607. More specifically, the avatar 604, the digital representation of the contact 606, and the virtual object 608 do not have to be presented within a predetermined distance of the HIPD 607.

User inputs provided at the wrist-wearable device 605, the AR device 700, and/or the HIPD 607 are coordinated such that the user can use any device to initiate, continue, and/or complete an operation. For example, the user 602 can provide a user input to the AR device 700 to cause the AR device 700 to present the virtual object 608 and, while the virtual object 608 is presented by the AR device 700, the user 602 can provide one or more hand gestures via the wrist-wearable device 605 to interact and/or manipulate the virtual object 608.

FIG. 6B shows the user 602 wearing the wrist-wearable device 605 and the AR device 700, and holding the HIPD 607. In the second AR system 600*b*, the wrist-wearable device 605, the AR device 700, and/or the HIPD 607 are used to receive and/or provide one or more messages to a contact of the user 602. In particular, the wrist-wearable device 605, the AR device 700, and/or the HIPD 607 detect and coordinate one or more user inputs to initiate a messaging application and prepare a response to a received message via the messaging application.

In some embodiments, the user 602 initiates, via a user input, an application on the wrist-wearable device 605, the AR device 700, and/or the HIPD 607 that causes the application to initiate on at least one device. For example, in the second AR system 600*b* the user 602 performs a hand gesture associated with a command for initiating a messaging application (represented by messaging user interface 612); the wrist-wearable device 605 detects the hand gesture; and, based on a determination that the user 602 is wearing AR device 700, causes the AR device 700 to present a messaging user interface 612 of the messaging application. The AR device 700 can present the messaging user interface 612 to the user 602 via its display (e.g., as shown by user 602's field of view 610). In some embodiments, the application is initiated and can be run on the device (e.g., the wrist-wearable device 605, the AR device 700, and/or the HIPD 607) that detects the user input to initiate the application, and the device provides another device operational data to cause the presentation of the messaging application. For example, the wrist-wearable device 605 can detect the user input to initiate a messaging application, initiate and run the messaging application, and provide operational data to the AR device 700 and/or the HIPD 607 to cause presentation of the messaging application. Alternatively, the application can be initiated and run at a device other than the device that detected the user input. For example, the wrist-wearable device 605 can detect the hand gesture associated with initiating the messaging application and cause the HIPD 607 to run the messaging application and coordinate the presentation of the messaging application.

Further, the user 602 can provide a user input provided at the wrist-wearable device 605, the AR device 700, and/or the HIPD 607 to continue and/or complete an operation initiated at another device. For example, after initiating the messaging application via the wrist-wearable device 605 and while the AR device 700 presents the messaging user interface 612, the user 602 can provide an input at the HIPD 607 to prepare a response (e.g., shown by the swipe gesture performed on the HIPD 607). The user 602's gestures performed on the HIPD 607 can be provided and/or displayed on another device. For example, the user 602's swipe gestures performed on the HIPD 607 are displayed on a virtual keyboard of the messaging user interface 612 displayed by the AR device 700.

In some embodiments, the wrist-wearable device 605, the AR device 700, the HIPD 607, and/or other communicatively coupled devices can present one or more notifications to the user 602. The notification can be an indication of a new message, an incoming call, an application update, a status update, etc. The user 602 can select the notification via the wrist-wearable device 605, the AR device 700, or the HIPD 607 and cause presentation of an application or operation associated with the notification on at least one device. For example, the user 602 can receive a notification that a message was received at the wrist-wearable device 605, the AR device 700, the HIPD 607, and/or other communicatively coupled device and provide a user input at the wrist-wearable device 605, the AR device 700, and/or the HIPD 607 to review the notification, and the device detecting the user input can cause an application associated with the notification to be initiated and/or presented at the wrist-wearable device 605, the AR device 700, and/or the HIPD 607.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 700 can present to the user 602 game application data and the HIPD 607 can use a controller to provide inputs to the game. Similarly, the user 602 can use the wrist-wearable device 605 to initiate a camera of the AR device 700, and the user can use the wrist-wearable device 605, the AR device 700, and/or the HIPD 607 to manipulate the image capture (e.g., zoom in or out, apply filters, etc.) and capture image data.

Turning to FIGS. 6C-1 and 6C-2, the user 602 is shown wearing the wrist-wearable device 605 and a VR device 710, and holding the HIPD 607. In the third AR system 600*c*, the wrist-wearable device 605, the VR device 710, and/or the HIPD 607 are used to interact within an AR environment, such as a VR game or other AR application. While the VR device 710 present a representation of a VR game (e.g., first AR game environment 620) to the user 602, the wrist-wearable device 605, the VR device 710, and/or the HIPD 607 detect and coordinate one or more user inputs to allow the user 602 to interact with the VR game.

In some embodiments, the user 602 can provide a user input via the wrist-wearable device 605, the VR device 710, and/or the HIPD 607 that causes an action in a corresponding AR environment. For example, the user 602 in the third AR system 600*c* (shown in FIG. 6C-1) raises the HIPD 607 to prepare for a swing in the first AR game environment 620. The VR device 710, responsive to the user 602 raising the HIPD 607, causes the AR representation of the user 622 to perform a similar action (e.g., raise a virtual object, such as a virtual sword 624). In some embodiments, each device uses respective sensor data and/or image data to detect the user input and provide an accurate representation of the user 602's motion. For example, image sensors (e.g., SLAM cameras or other cameras) of the HIPD 607 can be used to detect a position of the 607 relative to the user 602's body such that the virtual object can be positioned appropriately within the first AR game environment 620; sensor data from the wrist-wearable device 605 can be used to detect a velocity at which the user 602 raises the HIPD 607 such that the AR representation of the user 622 and the virtual sword 624 are synchronized with the user 602's movements; and image sensors 726 (FIGS. 7A-7C) of the VR device 710 can be used to represent the user 602's body, boundary conditions, or real-world objects within the first AR game environment 620.

In FIG. 6C-2, the user 602 performs a downward swing while holding the HIPD 607. The user 602's downward swing is detected by the wrist-wearable device 605, the VR device 710, and/or the HIPD 607 and a corresponding action is performed in the first AR game environment 620. In some embodiments, the data captured by each device is used to improve the user's experience within the AR environment. For example, sensor data of the wrist-wearable device 605 can be used to determine a speed and/or force at which the downward swing is performed and image sensors of the HIPD 607 and/or the VR device 710 can be used to determine a location of the swing and how it should be represented in the first AR game environment 620, which, in turn, can be used as inputs for the AR environment (e.g., game mechanics, which can use detected speed, force, locations, and/or aspects of the user 602's actions to classify a user's inputs (e.g., user performs a light strike, hard strike, critical strike, glancing strike, miss) or calculate an output (e.g., amount of damage)).

While the wrist-wearable device 605, the VR device 710, and/or the HIPD 607 are described as detecting user inputs, in some embodiments, user inputs are detected at a single device (with the single device being responsible for distributing signals to the other devices for performing the user input). For example, the HIPD 607 can operate an application for generating the first AR game environment 620 and provide the VR device 710 with corresponding data for causing the presentation of the first AR game environment 620, as well as detect the 602's movements (while holding the HIPD 607) to cause the performance of corresponding actions within the first AR game environment 620. Additionally or alternatively, in some embodiments, operational data (e.g., sensor data, image data, application data, device data, and/or other data) of one or more devices is provide to a single device (e.g., the HIPD 607) to process the operational data and cause respective devices to perform an action associated with processed operational data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Example Head-Wearable Devices

Figure 7A:
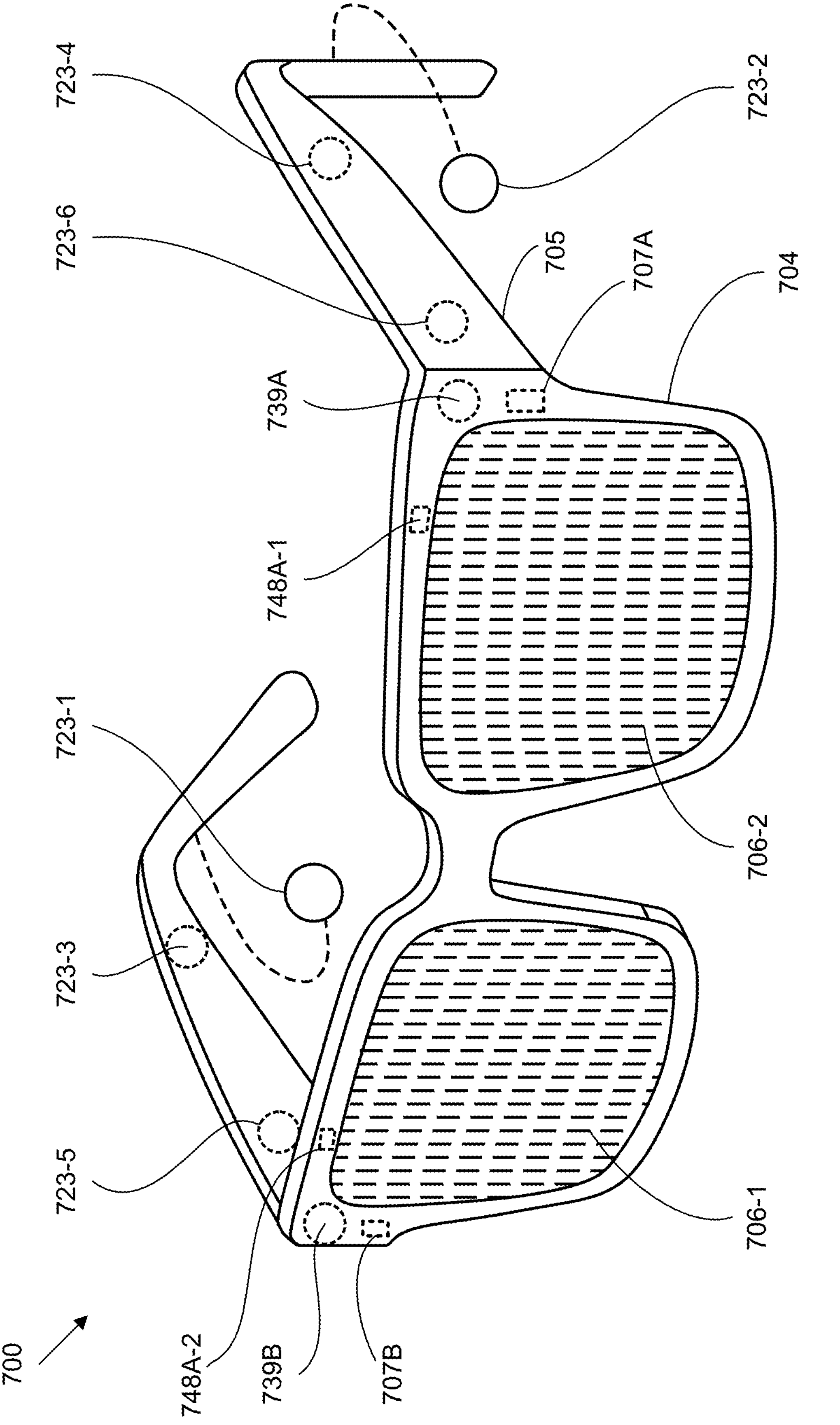
FIGS. 7A-7C show example head-wearable devices, in accordance with some embodiments.
Figures 1, 7B:
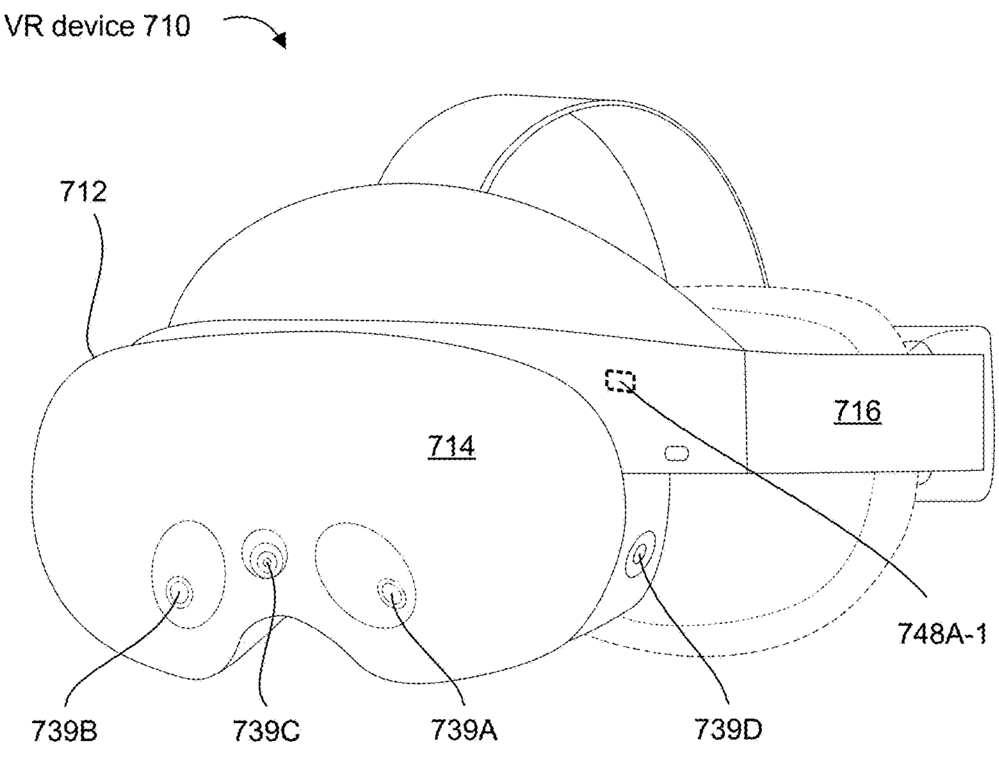
Figures 2, 7B:
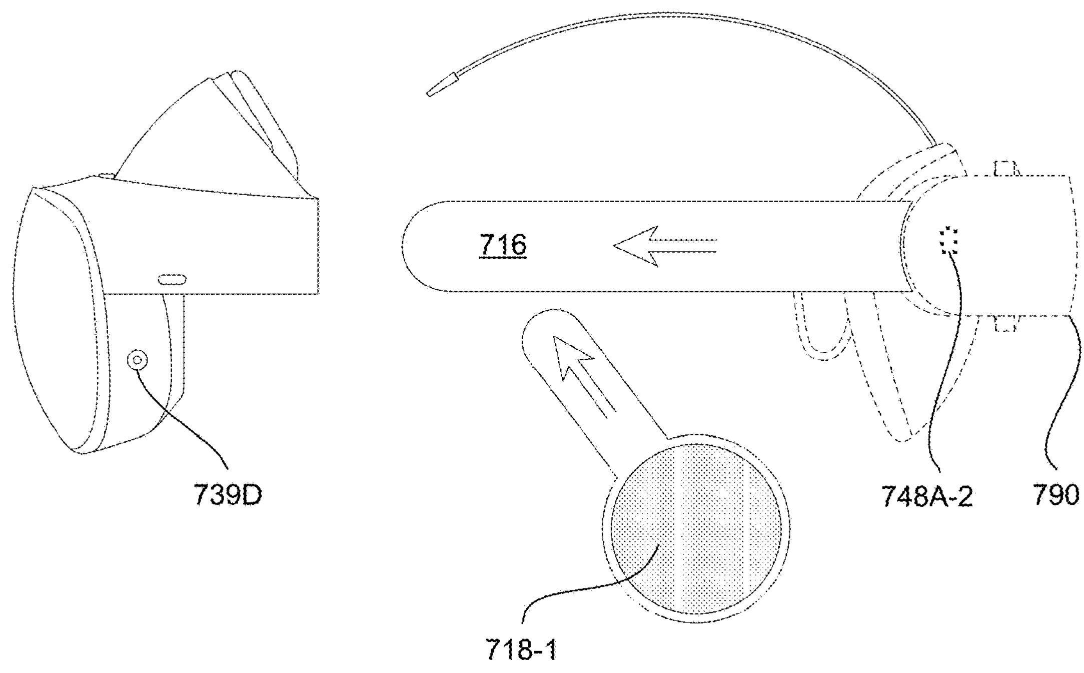
Figure 7C:
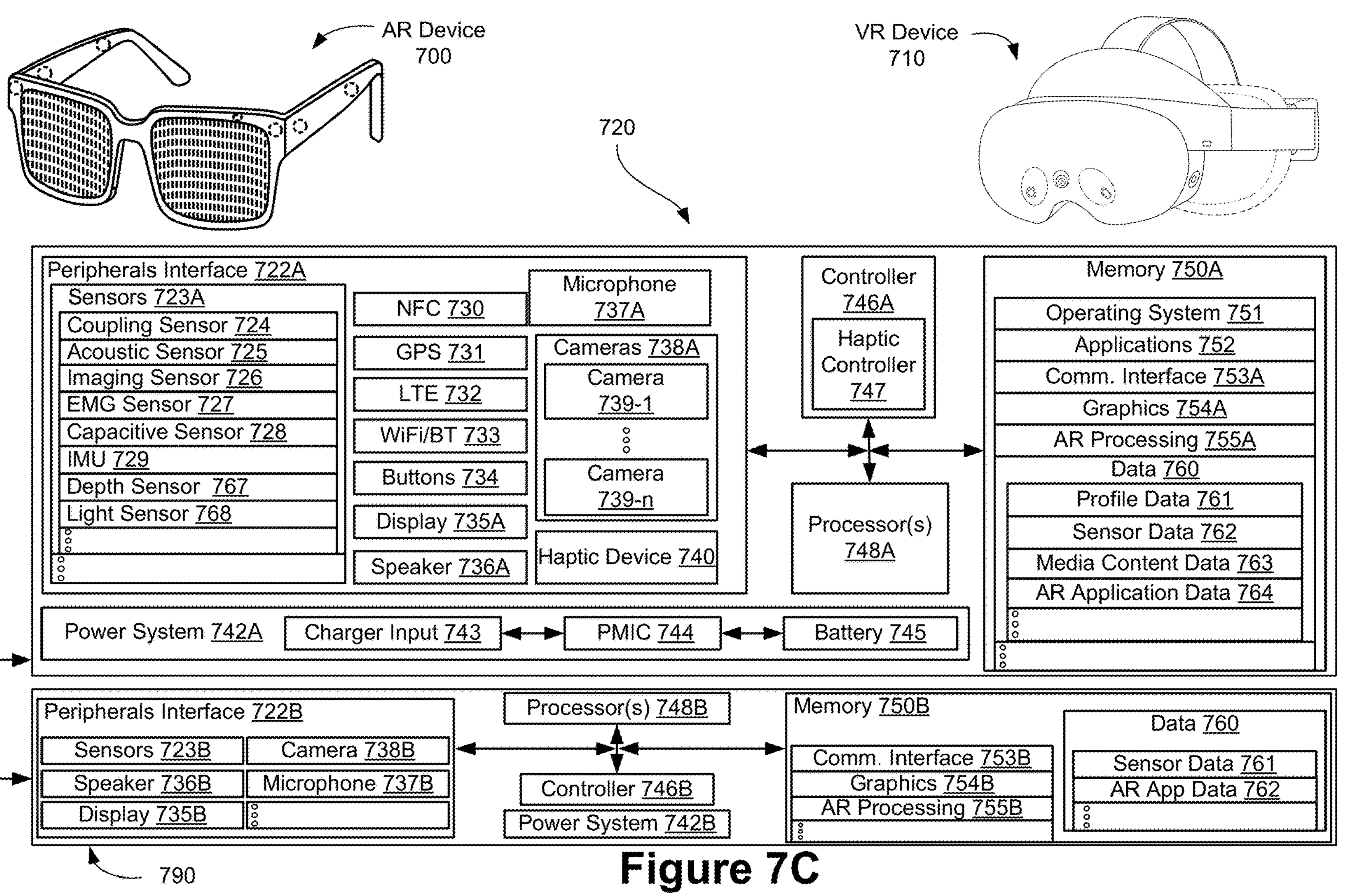

FIGS. 7A-7C show example head-wearable devices, in accordance with some embodiments. Head-wearable devices can include, but are not limited to, AR devices 710 (e.g., AR or smart eyewear devices, such as smart glasses, smart monocles, smart contacts, etc.), VR devices 710 (e.g., VR headsets, head-mounted displays (HMD)s, etc.), or other ocularly coupled devices. The AR devices 700 and the VR devices 710 are instances of the head-wearable devices 100 described in reference to FIGS. 1-5C and 8 herein, such that the head-wearable device should be understood to have the features of the AR devices 700 and/or the VR devices 710, and vice versa. The AR devices 700 and the VR devices 710 can perform various functions and/or operations associated with navigating through user interfaces and selectively opening applications, as well as the functions and/or operations described above with reference to FIGS. 1-5C.

In some embodiments, an AR system (e.g., AR systems 600*a*-600*c*; FIGS. 6A-6C-2) includes an AR device 700 (as shown in FIG. 7A) and/or VR device 710 (as shown in FIGS. 7B-1-B-2). In some embodiments, the AR device 700 and the VR device 710 can include one or more analogous components (e.g., components for presenting interactive artificial-reality environments, such as processors, memory, and/or presentation devices, including one or more displays and/or one or more waveguides), some of which are described in more detail with respect to FIG. 7C. The head-wearable devices can use display projectors (e.g., display projector assemblies 707A and 707B) and/or waveguides for projecting representations of data to a user. Some embodiments of head-wearable devices do not include displays.

FIG. 7A shows an example visual depiction of the AR device 700 (e.g., which may also be described herein as augmented-reality glasses and/or smart glasses). The AR device 700 can work in conjunction with additional electronic components that are not shown in FIGS. 7A, such as a wearable accessory device and/or an intermediary processing device, in electronic communication or otherwise configured to be used in conjunction with the AR device 700. In some embodiments, the wearable accessory device and/or the intermediary processing device may be configured to couple with the AR device 700 via a coupling mechanism in electronic communication with a coupling sensor 724, where the coupling sensor 724 can detect when an electronic device becomes physically or electronically coupled with the AR device 700. In some embodiments, the AR device 700 can be configured to couple to a housing (e.g., a portion of frame 704 or temple arms 705), which may include one or more additional coupling mechanisms configured to couple with additional accessory devices. The components shown in FIG. 7A can be implemented in hardware, software, firmware, or a combination thereof, including one or more signal-processing components and/or application-specific integrated circuits (ASICs).

The AR device 700 includes mechanical glasses components, including a frame 704 configured to hold one or more lenses (e.g., one or both lenses 706-1 and 706-2). One of ordinary skill in the art will appreciate that the AR device 700 can include additional mechanical components, such as hinges configured to allow portions of the frame 704 of the AR device 700 to be folded and unfolded, a bridge configured to span the gap between the lenses 706-1 and 706-2 and rest on the user's nose, nose pads configured to rest on the bridge of the nose and provide support for the AR device 700, earpieces configured to rest on the user's ears and provide additional support for the AR device 700, temple arms 705 configured to extend from the hinges to the earpieces of the AR device 700, and the like. One of ordinary skill in the art will further appreciate that some examples of the AR device 700 can include none of the mechanical components described herein. For example, smart contact lenses configured to present artificial-reality to users may not include any components of the AR device 700.

The lenses 706-1 and 706-2 can be individual displays or display devices (e.g., a waveguide for projected representations). The lenses 706-1 and 706-2 may act together or independently to present an image or series of images to a user. In some embodiments, the lenses 706-1 and 706-2 can operate in conjunction with one or more display projector assemblies 707A and 707B to present image data to a user. While the AR device 700 includes two displays, embodiments of this disclosure may be implemented in AR devices with a single near-eye display (NED) or more than two NEDs.

The AR device 700 includes electronic components, many of which will be described in more detail below with respect to FIG. 7C. Some example electronic components are illustrated in FIG. 7A, including sensors 723-1, 723-2, 723-3, 723-4, 723-5, and 723-6, which can be distributed along a substantial portion of the frame 704 of the AR device 700. The different types of sensors are described below in reference to FIG. 7C. The AR device 700 also includes a left camera 739A and a right camera 739B, which are located on different sides of the frame 704. And the eyewear device includes one or more processors 748A and 748B (e.g., an integral microprocessor, such as an ASIC) that is embedded into a portion of the frame 704.

FIGS. 7B-1 and 7B-2 show an example visual depiction of the VR device 710 (e.g., a head-mounted display (HMD) 712, also referred to herein as an artificial-reality headset, a head-wearable device, a VR headset, etc.). The HMD 712 includes a front body 714 and a frame 716 (e.g., a strap or band) shaped to fit around a user's head. In some embodiments, the front body 714 and/or the frame 716 includes one or more electronic elements for facilitating presentation of and/or interactions with an AR and/or VR system (e.g., displays, processors (e.g., processor 748A-1), IMUs, tracking emitter or detectors, sensors, etc.). In some embodiments, the HMD 712 includes output audio transducers (e.g., an audio transducer 718-1), as shown in FIG. 7B-2. In some embodiments, one or more components, such as the output audio transducer(s) 718-1 and the frame 716, can be configured to attach and detach (e.g., are detachably attachable) to the HMD 712 (e.g., a portion or all of the frame 716, and/or the output audio transducer 718-1), as shown in FIG. 7B-2. In some embodiments, coupling a detachable component to the HMD 712 causes the detachable component to come into electronic communication with the HMD 712. The VR device 710 includes electronic components, many of which will be described in more detail below with respect to FIG. 7C FIG. 7B-1 to 7B-2 also show that the VR device 710 one or more cameras, such as the left camera 739A and the right camera 739B, which can be analogous to the left and right cameras on the frame 704 of the AR device 700. In some embodiments, the VR device 710 includes one or more additional cameras (e.g., cameras 739C and 739D), which can be configured to augment image data obtained by the cameras 739A and 739B by providing more information. For example, the camera 739C can be used to supply color information that is not discerned by cameras 739A and 739B. In some embodiments, one or more of the cameras 739A to 739D can include an optional IR cut filter configured to remove IR light from being received at the respective camera sensors.

The VR device 710 can include a housing 790 storing one or more components of the VR device 710 and/or additional components of the VR device 710. The housing 790 can be a modular electronic device configured to couple with the VR device 710 (or an AR device 700) and supplement and/or extend the capabilities of the VR device 710 (or an AR device 700). For example, the housing 790 can include additional sensors, cameras, power sources, processors (e.g., processor 748A-2), etc. to improve and/or increase the functionality of the VR device 710. Examples of the different components included in the housing 790 are described below in reference to FIG. 7C.

Alternatively or in addition, in some embodiments, the head-wearable device, such as the VR device 710 and/or the AR device 700), includes, or is communicatively coupled to, another external device (e.g., a paired device), such as an HIPD 607 and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD device 607, an optional neckband, and/or wearable accessory device) with the head-wearable devices (e.g., an AR device 700 and/or VR device 710) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 607) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 607, can process information generated by one or more sensors of its sensors and/or information provided by other communicatively coupled devices. For example, a head-wearable device can include an IMU, and the intermediary processing device (neckband and/or an HIPD 607) can compute all inertial and spatial calculations from the IMUs located on the head-wearable device. Additional examples of processing performed by a communicatively coupled device, such as the HIPD 607.

Artificial-reality systems may include a variety of types of visual feedback mechanisms. For example, display devices in the AR devices 700 and/or the VR devices 710 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 700 and/or the VR device 710 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 700 and the VR device 710, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 700 and/or the VR device 710 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 605, an HIPD 607, smart textile-based garment (not shown), etc.), and/or other devices described herein.

FIG. 7C illustrates a computing system 720 and an optional housing 790, each of which show components that can be included in a head-wearable device (e.g., the AR device 700 and/or the VR device 710). In some embodiments, more or less components can be included in the optional housing 790 depending on practical restraints of the respective head-wearable device being described. Additionally or alternatively, the optional housing 790 can include additional components to expand and/or augment the functionality of a head-wearable device.

In some embodiments, the computing system 720 and/or the optional housing 790 can include one or more peripheral interfaces 722A and 722B, one or more power systems 742A and 742B (including charger input 743, PMIC 744, and battery 745), one or more controllers 746A 746B (including one or more haptic controllers 747), one or more processors 748A and 748B (as defined above, including any of the examples provided), and memory 750A and 750B, which can all be in electronic communication with each other. For example, the one or more processors 748A and/or 748B can be configured to execute instructions stored in the memory 750A and/or 750B, which can cause a controller of the one or more controllers 746A and/or 746B to cause operations to be performed at one or more peripheral devices of the peripherals interfaces 722A and/or 722B. In some embodiments, each operation described can occur based on electrical power provided by the power system 742A and/or 742B.

In some embodiments, the peripherals interface 722A can include one or more devices configured to be part of the computing system 720. For example, the peripherals interface can include one or more sensors 723A. Some example sensors include: one or more coupling sensors 724, one or more acoustic sensors 725, one or more imaging sensors 726, one or more EMG sensors 727, one or more capacitive sensors 728, and/or one or more IMUs 729. In some embodiments, the sensors 723A further include depth sensors 767, light sensors 768 and/or any other types of sensors defined above or described with respect to any other embodiments discussed herein.

In some embodiments, the peripherals interface can include one or more additional peripheral devices, including one or more NFC devices 730, one or more GPS devices 731, one or more LTE devices 732, one or more WiFi and/or Bluetooth devices 733, one or more buttons 734 (e.g., including buttons that are slidable or otherwise adjustable), one or more displays 735A, one or more speakers 736A, one or more microphones 737A, one or more cameras 738A (e.g., including the a first camera 739-1 through nth camera **739-*n*, which are analogous to the left camera 739A and/or the right camera 739B), one or more haptic devices 740**; and/or any other types of peripheral devices defined above or described with respect to any other embodiments discussed herein.

The head-wearable devices can include a variety of types of visual feedback mechanisms (e.g., presentation devices). For example, display devices in the AR device 700 and/or the VR device 710 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 735A can be coupled to each of the lenses 706-1 and 706-2 of the AR device 700. The displays 735A coupled to each of the lenses 706-1 and 706-2 can act together or independently to present an image or series of images to a user. In some embodiments, the AR device 700 and/or the VR device 710 includes a single display 735A (e.g., a near-eye display) or more than two displays 735A.

In some embodiments, a first set of one or more displays 735A can be used to present an augmented-reality environment, and a second set of one or more display devices 735A can be used to present a virtual-reality environment. In some embodiments, one or more waveguides are used in conjunction with presenting artificial-reality content to the user of the AR device 700 and/or the VR device 710 (e.g., as a means of delivering light from a display projector assembly and/or one or more displays 735A to the user's eyes). In some embodiments, one or more waveguides are fully or partially integrated into the AR device 700 and/or the VR device 710. Additionally, or alternatively to display screens, some artificial-reality systems include one or more projection systems. For example, display devices in the AR device 700 and/or the VR device 710 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 735A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 735A for presenting information to users. For example, an external display 735A can be used to show a current battery level, network activity (e.g., connected, disconnected, etc.), current activity (e.g., playing a game, in a call, in a meeting, watching a movie, etc.), and/or other relevant information. In some embodiments, the external displays 735A can be used to communicate with others. For example, a user of the head-wearable device can cause the external displays 735A to present a do not disturb notification. The external displays 735A can also be used by the user to share any information captured by the one or more components of the peripherals interface 722A and/or generated by head-wearable device (e.g., during operation and/or performance of one or more applications).

The memory 750A can include instructions and/or data executable by one or more processors 748A (and/or processors 748B of the housing 790) and/or a memory controller of the one or more controllers 746A (and/or controller 746B of the housing 790). The memory 750A can include one or more operating systems 751; one or more applications 752; one or more communication interface modules 753A; one or more graphics modules 754A; one or more AR processing modules 755A; and/or any other types of modules or components defined above or described with respect to any other embodiments discussed herein.

The data 760 stored in memory 750A can be used in conjunction with one or more of the applications and/or programs discussed above. The data 760 can include profile data 761; sensor data 762; media content data 763; AR application data 764; and/or any other types of data defined above or described with respect to any other embodiments discussed herein.

In some embodiments, the controller 746A of the head-wearable devices processes information generated by the sensors 723A on the head-wearable devices and/or another component of the head-wearable devices and/or communicatively coupled with the head-wearable devices (e.g., components of the housing 790, such as components of peripherals interface 722B). For example, the controller 746A can process information from the acoustic sensors 725 and/or image sensors 726. For each detected sound, the controller 746A can perform a direction of arrival (DOA) estimation to estimate a direction from which the detected sound arrived at a head-wearable device. As one or more of the acoustic sensors 725 detects sounds, the controller 746A can populate an audio data set with the information (e.g., represented by sensor data 762).

In some embodiments, a physical electronic connector can convey information between the head-wearable devices and another electronic device, and/or between one or more processors 748A of the head-wearable devices and the controller 746A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 607) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 700 and/or the VR device 710 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 7B-1 and 7B-2 show the VR device 710 having cameras 739A-739D, which can be used to provide depth information for creating a voxel field and a two-dimensional mesh to provide object information to the user to avoid collisions.

The optional housing 790 can include analogous components to those describe above with respect to the computing system 720. For example, the optional housing 790 can include a respective peripherals interface 722B including more or less components to those described above with respect to the peripherals interface 722A. As described above, the components of the optional housing 790 can be used augment and/or expand on the functionality of the head-wearable devices. For example, the optional housing 790 can include respective sensors 723B, speakers 736B, displays 735B, microphones 737B, cameras 738B, and/or other components to capture and/or present data. Similarly, the optional housing 790 can include one or more processors 748B, controllers 746B, and/or memory 750B (including respective communication interface modules 753B; one or more graphics modules 754B; one or more AR processing modules 755B, etc.) that can be used individually and/or in conjunction with the components of the computing system 720.

The techniques described above in FIGS. 7A-7C can be used with different head-wearable devices. In some embodiments, the head-wearable devices (e.g., the AR device 700 and/or the VR device 710) can be used in conjunction with one or more wearable device such as a wrist-wearable device 605 (or components thereof) and/or a smart textile-based garment, as well as an HIPD 607. In some embodiments, wearable devices communicatively coupled with the head-wearable device can also be configured to be used to allow a user to control aspect of the artificial reality (e.g., by using EMG-based gestures of the wrist-wearable device 605 to control user interface objects in the artificial reality and/or by allowing a user to interact with the touchscreen on the wrist-wearable device to also control aspects of the artificial reality).

FIG. 8 illustrates a flow diagram of a method for forming a head-wearable device, according to some embodiments. The method 800 can be used to form any head-wearable device with FIGS. 1-7C. The method 800 includes providing (810) a display (e.g., HMD 114). For example, in some embodiments the head-wearable device 100 includes a housing 106 and an HMD 114 coupled together via a retractable side strap 102.

The method 800 includes providing (812) a retractable side strap coupled with the display, the retractable side strap including a housing. As described in FIGS. 1 and 2A-7B, the retractable side strap 102 is physically coupled to the HMD 114 and the housing 106. In some embodiments, portions of the retractable side strap 102 are housed inside of the housing 106. The portions retractable side strap 102 outside of the housing 106 are part of the exposed portion of the retractable side strap 102. Decreasing and increasing the length of the exposed portion of the retractable side strap 102, allows the head-wearable device 100 to accommodate a plurality of head sizes.

The method 800 includes providing (814) an anchor point. As described in FIG. 2, the anchor point can be a plurality of anchor points (e.g., anchor points 220*a*-220*d* and 320). The cable 230 travels around the plurality of anchor points 220 in order to maintain tension on the cable and redirect the cable 230 such that the cable 230 can couple to the retractable side strap 102. As described in FIG. 2, the anchor points 220 are coupled to the backplate 206 (a portion of the housing 106).

The method 800 includes providing (816) a cable. In some embodiments, as described in FIG. 2, the cable 230 travels throughout the housing in a predetermined path and adjusts the retractable side straps 102 when the adjustment mechanism 210 is actuated. The cable 230 is coupled to the adjustment mechanism 210 and travels through cable guide paths 240 of the backplate 206 to the retractable side strap 102.

The method 800 includes providing (818*a*) a first end of the cable coupled to a first cable-spooling portion of the adjustment mechanism, an (818*b*) intermediary portion of the cable that travels around the anchor point and is coupled with a portion the retractable side strap, and a (818*c*) second end of the cable coupled to a second cable-spooling portion of the adjustment mechanism. For example, as described in FIG. 2 above, the first end 230*a* of the cable 230 is coupled to a first hole 515 in a first cable-spooling portion 510 of the adjustment mechanism, and the second end 230*a* of the cable 230 is coupled to a second hole 525 in the second cable-spooling portion 520 of the adjustment mechanism. As described in FIG. 3A, an intermediary portion of the cable 230 extends from the first end 230*a* and travels to an anchor point 220 on the first side of the housing 104*a*. Similarly, an intermediary portion of the cable 230 extends from the second end 230*b* of the cable 230 and travels to another anchor point 220 on the first 104*a* side of the housing 106. After both intermediary portions of the cable 230 travel around the anchor point 220 on the first side 104*a* of the housing, they connect with their respective ends of the retractable side strap 102. This is further discussed above in FIG. 3D.

The method 800 includes providing (820) an adjustment mechanism configured to be adjusted to change an exposed length of the retractable side strap that is outside of the housing. As discussed above in FIG. 2, in some embodiments, the adjustment mechanism 210 is configured to be adjusted in a first direction or a second direction a predetermined number of times. Once the adjustment mechanism is adjusted, the exposed portion of the retractable side strap 102 either increases or decreases. For example, in some embodiments as discussed above in 4A-4C, when the user adjusts the adjustment mechanism in a first direction (e.g., clockwise), the two ends of the retractable side strap 102*a* and 102*b* travel toward each other decreasing the length of the exposed portion of the retractable side strap, and when the user adjusts the adjustment mechanism in a second direction (e.g., counterclockwise), the two ends of the retractable side strap 102*a* and 102*b* travel apart from each other increasing the length of the exposed portion for the retractable side strap.

The method 800 includes providing (822) at least one of the adjustment mechanism and the anchor point maintain the cable at a predetermined tension. As discussed in FIGS. 3A-3D above, the cable 230 is maintained at a predetermined tension in order to move the ends of the retractable side strap 102*a* and 102*b*, and the tension is maintained by the adjustment mechanism 210, an anchor point 220, or additional element coupled to the adjustment mechanism or the cable. For example, as described in FIG. 3C, a spring element 334 is coupled to an anchor point 320 in order to maintain the tension on the cable 230.

The method 800 includes providing (824) the adjustment mechanism winding the cable around the first cable-spooling portion of the adjustment mechanism or the second cable-spooling portion of the adjustment mechanism. For example, in some embodiments as described in FIG. 2, when the adjustment mechanism 210 is adjusted by the user 110 in a second direction, a first windable portion of the cable 230 is wound around the first cable-spooling portion of the adjustment mechanism and a second windable portion of the cable 230 is unwound around the second cable-spooling portion of the adjustment mechanism. In some embodiments, when the adjustment mechanism 210 is adjusted by the user 110 in a first direction, a first windable portion of the cable 230 is unwound around the first cable-spooling portion of the adjustment mechanism and a second windable portion of the cable 230 is wound around the second cable-spooling portion of the adjustment mechanism.

The method 800 includes providing (826) the adjustment mechanism adjusting the exposed length of the retractable side strap to allow the head-wearable device to accommodate respective head sizes for a plurality of users of the head-wearable device. As described in FIG. 2 above, the exposed length of the retractable side strap 102 is increased or decreased by adjusting the adjustment mechanism and moving the cable in a first or second direction. The exposed length of the retractable side strap 102 is increased and decreased to allow the head-wearable device to be worn by a plurality of users which varying head sizes. Additionally, this method of adjusting the retractable side strap 102 accommodates for additional head sizes because the ends of the retractable side strap 102*a* and 102*b* can travel farther inside of the housing 106 than conventional solutions.

Example Aspects

A few example aspects will now be briefly described.

(A1) In one aspect, a head-wearable device is disclosed. In some embodiments, the head-wearable device includes a display (e.g., head-mounted display (HMD) 114), a retractable side strap (e.g., retractable side strap 102) coupled with the display, and a housing (e.g., housing 106). For example, as shown and described in FIG. 1, the retractable strap 102 is coupled to the HMD 114 and the housing 106. The housing includes an anchor point (e.g., one or more anchor points 220), a cable (e.g., cable 230), and an adjustment mechanism (e.g., adjustment mechanism 210) configured to be adjusted to change an exposed length of the retractable side strap that is outside of the housing. The cable includes a first end (e.g., first end 230*a* of cable 230) coupled to a first cable-spooling portion of the adjustment mechanism (e.g., a first cable-spooling portion 510 of the adjustment mechanism), an intermediary portion of the cable that travels around the anchor point (e.g., anchor points 220) and is coupled with a portion of the retractable side strap, and a second end (e.g., second end 230*b* of cable 230) coupled to a second cable-spooling portion of the adjustment mechanism (e.g., a second cable-spooling portion of the adjustment mechanism 520). At least one of the adjustment mechanism and the anchor point maintain the cable at a predetermined tension, such that when the adjustment mechanism is adjusted, the adjustment mechanism: (i) winds the cable around the first cable-spooling portion of the adjustment mechanism or the second cable-spooling portion of the adjustment mechanism, and (ii) adjusts the exposed length of the retractable side strap to allow the head-wearable device to accommodate respective head sizes for a plurality of users of the head-wearable device. For example, as discussed in FIG. 2 above, when the adjustment mechanism 210 is actuated by the user 110, the cable 230 winds around the cable-spooling portion 212 of the adjustment mechanism, moves the ends of the retractable side strap 102*a* and 102*b* and increases or decreases the length of the exposed retractable side strap 102 to alter the size of head-wearable device worn by a user 110.

(A2) In some embodiments of A1, the anchor point (e.g., anchor point 220) is at least one of a fixed pully, a moving pully (e.g., anchor point 320), or a static post. For example, as described in FIG. 2 and FIG. 3A-3D, the anchor point can be a static or dynamic moving component in order to control the tension on the cable 230.

(A3) In some embodiments of A1, the adjustment mechanism (e.g., adjustment mechanism 210) includes a single drum or a double drum coupled to an exposed handwheel for manual user (e.g., user 110) adjustment. For example, as shown in FIGS. 5A1-9, the cable-spooling portion 212 of the adjustment mechanism 210 can have several different widths or number of drums to accommodate more cable or decrease friction.

(A4) In some embodiments of A1, the adjustment mechanism (e.g., adjustment mechanism 210) is coupled to a spring element (e.g., spring element 334), such that the cable (e.g., cable 230) maintains the predetermined tension. For example, as described in FIG. 3B, the spring element 334 provides a tensioning element to the system such that the cable 230 can maintain a predetermined tension.

(A5) In some embodiments of A1, the anchor point (e.g., anchor point 220) is coupled to a spring element (e.g., spring element 334), such that the cable (e.g., cable 230) maintains the predetermined tension. For example, as described in FIG. 3B, the anchor point 320 is coupled to a spring element 334 such that the spring element 334 can alter the tension of the cable 230 via the anchor point 320 and maintain the predetermined tension on the cable 230.

(A6) In some embodiments of A1, the cable (e.g., cable 230) is coupled to the spring element (e.g., spring element 334) such that the cable maintains the predetermined tension. For example, as described in FIG. 3B, the cable 230 is coupled to a tensioning system such as a spring element 334 to maintain a predetermined tension on the cable 230.

(A7) In some embodiments of A5, the anchor point is one of a plurality of anchor points (e.g., anchor points 220*a*-220*d* and 320) and a respective anchor point of the plurality of anchor points (e.g., anchor point 320) is coupled to a spring element (e.g., spring element 334) and the cable (e.g., cable 230), such that the cable maintains the predetermined tension. For example, as shown and described in FIG. 3B, the cable 230 travels around an anchor point 320 which is coupled to a spring element 320.

(A8) In some embodiments of A3, the exposed handwheel has a predetermined diameter and the exposed handwheel extends in part outside of the housing (e.g., housing 106). For example, as discussed in FIG. 2, the exposed handwheel of the adjustment mechanism 212 is partially contained inside of the housing 106.

(A9) In some embodiments of A1, the first cable-spooling portion (e.g., the first cable-spooling portion 510) of the adjustment mechanism is configured to be positioned a first distance away from a user's head when the head-wearable device (e.g., head-wearable device 100) is worn by the user (e.g., user 110) and the second cable-spooling portion (e.g., the second cable-spooling portion 520) of the adjustment mechanism is configured to be positioned a second distance away, larger than the first distance, from the user's head when the head-wearable device is worn by the user. For example, as described in FIG. 2, while the user is wearing the head-wearable device 100, the cable-spooling portion includes two distinct portions, such that a first cable-spooling 510 portion is closer to the user's head than the second cable-spooling portion 520.

(A10) In some embodiments of A9, the first cable-spooling portion of the adjustment mechanism includes a first radius and the second cable-spooling portion includes a second radius. For example, as described in FIG. 2, the first and second cable-spooling portions can have radii that are the same or two distinct sizes.

(A11) In some embodiments of A1, the intermediary portion of the cable includes a first windable segment extending from the first end of the cable and a second windable segment extending from the second end of the cable. When the adjustment mechanism is actuated in a first direction, a part of the first windable segment of the cable unwinds around the first cable-spooling portion of the adjustment mechanism, and a part of the second windable segment of the cable winds around the second cable-spooling portion of the adjustment mechanism. For example, as explained in FIG. 2, in some embodiments a first cable-spooling portion of the adjustment mechanism acts as a take up drum (e.g., the cable is winding around the drum and the cable-spooling portions takes up the slack) and the second cable-spooling portion of the adjustment mechanism acts as a cable release drum (e.g., where the cable is unwinding around the drum).

(A12) In some embodiments of A11, the exposed length of the retractable side strap is at its longest length, the first windable segment of the cable has a first length of cable wound around the first cable-spooling portion of the adjustment mechanism and the second windable segment of the cable has a second length of cable wound around the second cable-spooling portion of the adjustment mechanism, the second length being less than the first length. For example, as shown in FIG. 4A, the exposed length of the retractable side strap 102 is at its longest. As described in FIG. 4A above, a maximum among of cable 230 is spooled onto the first cable-spooling portion 510 of the adjustment mechanism and a minimum amount of cable 230 is spooled onto the second cable-spooling portion 520 of the adjustment mechanism.

(A13) In some embodiments of A11, when the adjustment mechanism is actuated in a second direction (e.g., counter clockwise), part of the first windable segment of the cable winds around the first cable-spooling portion of the adjustment mechanism, and part of the second windable segment of the cable unwinds around the second cable-spooling portion of the adjustment mechanism. For example, as described in FIG. 4C, when the adjustment mechanism as adjusted in a second direction, the cable starts to unwind around the second cable-spooling portion 510 of the adjustment mechanism and starts to wind around the first cable-spooling portion 520 of the adjustment mechanism. This results in the ends of the retractable side strap 102*a* and 102*b* moving away from each other such that the first end 102*a* of the retractable side strap moves towards the first side of the housing 104*a* and the second end 102*b* of the retractable side strap moves towards the second side 104*b* of the housing.

(A14) In some embodiments of A13, when the exposed length of the retractable side strap 102 is at its shortest length, the first windable segment of the cable (e.g., cable 230) has a third length of cable wound around the first cable-spooling portion (e.g., the first cable-spooling portion 510) of the adjustment mechanism and the second windable segment of the cable has a fourth length of cable wound around the second cable-spooling portion (e.g., the second cable-spooling portion 520) of the adjustment mechanism. For example, FIG. 4C illustrates the exposed portion of the retractable side strap 102 at its shortest. Additionally, as described above in FIG. 4C, the third length of cable wound around the first cable-spooling portion 510 is at a minimum length, and the fourth length of cable wound around the second cable-spooling portion 520 is at a maximum length.

(A15) In some embodiments of A11, the first windable segment of the cable (e.g., cable 230) winds around the first cable-spooling portion (e.g., the first cable-spooling portion 510) of the adjustment mechanism at a first rate and the second windable segment of the cable unwinds around the second cable-spooling portion (e.g., the second cable-spooling portion 520) of the adjustment mechanism at a second rate. For example, as described in FIG. 2, the rates at which the cable 230 unspools from the first and second and cable-spooling portions 510 and 520 can differ or be the same depending on if the cable-spooling portion is a single or double drum and depending on how much cable is spooled on both the first and second and cable-spooling portions 510 and 520.

(A16) In some embodiments of A1, the retractable side strap (e.g., retractable side strap 102) includes cut out portions to guide the cable (e.g., the cable 230). For example, as described in FIG. 3D, the retractable side strap 102 includes cut out portions which the cable 230 travels in to reduce friction on the cable 230 and guide the cable 230 on its predetermined path.

(A17) In some embodiments of A1, the retractable side strap (e.g., retractable side strap 102) includes a first end (e.g., first end 102*a* of the retractable side strap) and a second end (e.g., second end 102*b* of the retractable side strap). Furthermore, the first end of the retractable side strap is positioned at a first end of the housing (e.g., first end of the housing 104*a*) and the second end of the retractable side strap is positioned at a second of the housing (e.g., second end of the housing 104*b*) when the retractable side strap is at its longest length, the first end of the retractable side strap is a positioned at the second end of the housing and the second end of the retractable side strap is at the first end of the housing when the retractable side strap is at its shortest length. For example, as described above in FIG. 4A, when the retractable side strap 102 is at its longest length, the first end of the retractable side strap is positioned at the first end of the housing and the second end of the retractable side strap is positioned at the second end of the housing. Additionally, as described above in FIG. 4C, the retractable side strap 102 is at its shortest exposed length and the first end of the retractable side strap is positioned at the second end of the housing and the second end of the retractable side strap is positioned at the first end of the housing.

(A18) In some embodiments of A17, a portion of the first intermediary portion of the cable travels through a portion of the first end of the retractable side strap and a portion of the second intermediary portion of the cable travels through a portion of the second end of the retractable side strap. When the adjustment mechanism is actuated in a first direction (e.g., clockwise), the intermediary portion the cable moves around the anchor point such that the first end of the retractable side strap moves towards the second end of the housing and the second end of the retractable side strap moves toward the first end of the housing, causing a length of the retractable side strap to decrease. Additionally, when the adjustment mechanism is actuated in a second direction (e.g., counterclockwise), the intermediary portion of the cable moves around the anchor point such that the first end of the retractable side strap moves towards the first end of the housing and the second end of the retractable side strap moves toward the second end of the housing, causing the length of the retractable side strap to increase.

(A19) In some embodiments of A17, when the adjustment mechanism (e.g., adjustment mechanism 210) is actuated in a first direction (e.g., clockwise) a predetermined amount, the second end of the retractable side strap travels behind the first end of the retractable side strap.

(A20) In some embodiments of A18, the portion of the first end of the retractable side strap is a first tip portion (e.g., first tip portion 202*b*), and the portion of the second end of the retractable side strap is a second tip portion (e.g., second tip portion 202*a*), and when the adjustment mechanism is actuated in the first direction (clockwise), the first tip portion of the retractable side strap travels towards the second end of the housing and the second tip portion of retractable side strap travels towards the first end of the housing.

(A21) In some embodiments of A20, when the retractable side strap (e.g., retractable side strap 102) is at its longest length, the first tip portion of the first end of the retractable side strap is adjacent to the end of the first end of the housing, the second tip portion of the second end of the retractable side strap is adjacent to the end of the second end of the housing, and the first tip portion of the first end of the retractable side strap and the second tip portion of the second end of the retractable side strap remain inside of the housing. For example, as shown in FIG. 4A, the exposed portion of the retractable side strap 102 is at its longest when the first end 102*a* of the retractable side strap is adjacent to the anchor points 220 on the first side 104*a* of the housing and the second end 102*b* of the retractable side strap is adjacent to the anchor points 220 on the second side 104*b* of the housing.

(A22) In some embodiments of A20, the anchor point (e.g., anchor point 220*a*) is a first anchor point at a first end of the housing (e.g., first side of the housing 104*a*), and the head-wearable device (e.g., head-wearable device 100) includes a second anchor point (e.g., anchor point 220*c*) at the second end of the housing (e.g., second side of the housing 104*b*). When the retractable side strap (e.g., retractable side strap 102) is at the minimum length (e.g., its shortest length), the first tip portion (e.g., first tip portion 202*b*) of the first end (e.g., first end 102*a*) of the retractable side strap is adjacent to the second anchor point (e.g., anchor point 220*c*) at the second end of the housing (e.g., second side of the housing 104*b*), the second tip portion (e.g., second tip portion 202*a*) of the second end (e.g., second end 102*b*) of the retractable side strap is adjacent to the first anchor point (e.g., anchor point 220*a*) at the first end (e.g., first side of the housing 104*a*) of the housing, and the first tip portion (e.g., first tip portion 202*b*) of the first end (e.g., first side of the housing 104*a*) of the retractable side strap and the second tip (e.g., second tip portion 202*a*) portion of the second end of the retractable side strap remain inside of the housing (e.g., housing 106). For example, as described in FIG. 4C, the head-wearable device 100 can accommodate its smallest head size when the exposed portion of the retractable side strap 102 is at its shortest, and the maximum length of the retractable side strap 102 is inside of the housing 106.

(A23) In some embodiments of A22, the first anchor point (e.g., anchor point 220*a*) at the first end (e.g., first side of the housing 104*a*) of the housing are behind the first end (e.g., first end 102*a*) of the retractable side strap, and the second anchor point (e.g., anchor point 220*c*) at a second end of the housing is in front of the second end of the retractable side strap. As described in FIG. 2, the anchor points 220*a* and 220*b* on the first side 104*a* of the housing are positioned below the first end 102*a* of the retractable side strap, to allow the first end 102*a* of the retractable side strap to travel from the first side 104*a* of the housing to the second side 104*b* of the housing. Additionally, the anchor points 220*c* and 220*d* on the second side 104*b* of the housing are positioned above the second end 102*b* of the retractable side strap such that the second end 102*b* of the retractable side strap can travel from the second side 104*b* of the housing to the first side 104*a* of the housing and below the first end 102*a* of the retractable side strap.

(A24) In some embodiments of A1, the housing (e.g., housing 106) of the retractable side strap (e.g., retractable side strap 102) further comprises a backplate (e.g., backplate 206) separating the retractable side strap (e.g., retractable side strap 102) and the adjustment mechanism (e.g., adjustment mechanism 210), the backplate (e.g., backplate 206) configured to guide the cable (e.g., cable 230) through retractable side strap (e.g., retractable side strap 102) to the first and second cable-spooling portions of the adjustment mechanism (e.g., first 510 and second 520 cable-spooling portions of the adjustment mechanism). For example, as described in FIG. 2, the backplate 206 separating the adjustment mechanism 210 and the retractable side strap 102 maintains the separation between the moving parts of the adjustment mechanism 210 and the moving ends of the retractable side strap 102.

(A25) In some embodiments of A24. the backplate (e.g., backplate 206) includes one or more cut out portions and the cable (e.g., cable 230) to travels through the one or more cut out portions of the backplate (e.g., cable guide paths 240 of the backplate 206). For example, as described in FIG. 3A, the cable guide paths 240 of the backplate 206 allow the cable 230 to travel from the adjustment mechanism 210 through the cable guide paths 240 of the backplate 206, to an anchor point 220.

(A26) In some embodiments of A25, the backplate (e.g., backplate 206) is mechanically coupled with the adjustment mechanism (e.g., adjustment mechanism 210) such that the cable (e.g., cable 230) travels from the first and second cable-spooling portions of the adjustment mechanism (e.g., first 510 and second 520 cable-spooling portions) via the one or more cable guide paths 240 of the backplate (e.g., backplate 206). In some embodiments, as described in FIG. 2, the cable 230 travels from a first 510 or second 520 cable-spooling portion of the adjustment mechanism to an anchor point 220*a* or 220*b* on the first side 104*a* of the housing.

(A27) In some embodiments of A1, the anchor point is one of a plurality of anchor points such that a first subset of anchor points is at a first end of the housing, a second subset of anchor points is at a second end of the housing, the second end of the housing opposite the first end of the housing. For example, as described above in FIG. 2, the anchor points 220 are positioned on the first side 104*a* of the housing and the second side 104*b* of the housing to increase the travel distance for the first end 102*a* and second end 102*b* of the retractable side strap. Additionally, the intermediary portion of the cable includes a first intermediary portion continuous with the first end of the cable and a second intermediary portion continuous with the second end of the cable to the second such that the first intermediary portion of the cable travels around the a first anchor point in the first subset of anchor points, and the second intermediary portion of the cable travels around a second anchor point in the first subset of anchor points. For example, as described in FIG. 3A above, the cable 230 travels on a predetermined path such that a first intermediary portion of the cable 230 travels from the first cable-spooling portion 510 of the adjustment mechanism to an anchor point 220*a* on the first side 104*a* of the housing, and the second intermediary portion of the cable 230 travels from the second cable-spooling portion 520 of the adjustment mechanism to an anchor point 220*b* on the first side 104*a* of the housing.

(A28) In some embodiments of A27, the first subset of anchor points (e.g., anchor points 220*a* and 220*b*) are positioned below the first end (e.g., first end 102*a*) of the retractable side strap and the second subset of anchor points (e.g., anchor points 220*c* and 220*d*) are positioned above the second end (e.g., second end 102*b*) of the retractable side strap. For example, as explained above in FIG. 2, the first subset of anchor points 220*a* and 220*b* are positioned such that the first end 102*a* of the retractable side strap can travel above the anchor points 220*a* and 220*b* such that the first end 102*a* of the retractable side strap can travel above the second end of the retractable side strap. Additionally, the second subset of anchor points 220*c* and 220*d* are positioned above the second end 102*b* of the retractable side strap such that the second end 102*b* of the retractable side strap can travel below the first end 102*a* of the retractable side strap. Each end of the retractable side strap 102*a* and 102*b* are on their own predetermined path so that they can travel one on top of the other and allow each end to travel the majority of the length of the housing 106.

(A29) In some embodiments of A24, the backplate (e.g., backplate 206) includes one or more friction pads between the retractable side strap (e.g., retractable side strap 102) and the backplate (e.g., backplate 206). As described in FIG. 2 above, some embodiments include friction pads to reduce the wear on the retractable side strap 102 against the backplate 206 as the strap travels across portions of the backplate when the adjustment mechanism 210 is adjusted by the user 110.

(A30) In some embodiments of A1, the adjustment mechanism (e.g., adjustment mechanism 210) is configured to be actuated in a first direction and a second direction a predetermined distance. For example, as described in FIG. 2, the adjustment mechanism 210 is limited on how many times it can be adjusted in either direction due to the limitation on the amount of cable 230 as well as the travel distance of the retractable side strap 102 inside of the housing 106.

(A31) In some embodiments of A1, the housing (e.g., housing 106) includes a channel configured to guide a portion of the retractable side strap (e.g., retractable side strap 102) along a predetermined path. For example, as described above in FIG. 2, the ends of the retractable side strap 102*a* and 102*b* are guided through the housing by at least the anchor points 220 coupled to the housing 106 or internal portions of the housing 106 which create a channel for the ends of the retractable side strap to travel in.

(A32) In some embodiments of A1, the second cable-spooling portion (e.g., second cable-spooling portion 520) of the adjustment mechanism is coupled to a cap (e.g., cap 216) configured to form a boundary between the adjustment mechanism (e.g., adjustment mechanism 216) and the retractable side strap (e.g., retractable side strap 102) such that the cable (e.g., cable 230) is contained inside of the adjustment mechanism (e.g., adjustment mechanism 210). For example, as described in FIG. 3A, the cap 216 confines the cable 230 to the adjustment mechanism 210 such that the cable 230 only travels outside of the adjustment mechanism via the cable guide paths 240 of the backplate 206.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A head-wearable device, comprising:

a display;

a retractable side strap coupled with the display, the retractable side strap including a housing comprising:

an anchor point;

an adjustment mechanism configured to be adjusted to change an exposed length of the retractable side strap that is outside of the housing;

a cable including:

a first end coupled to a first cable-spooling portion of the adjustment mechanism, an intermediary portion of the cable that travels around the anchor point and is coupled with a portion of the retractable side strap, and a second end coupled to a second cable-spooling portion of the adjustment mechanism, wherein the intermediary portion of the cable includes a first windable segment extending from the first end of the cable and a second windable segment extending from the second end of the cable, and actuation of the adjustment mechanism results in winding or unwinding of at least a portion of each of the first windable segment and the second windable segment;

wherein at least one of the adjustment mechanism and the anchor point maintain the cable at a predetermined tension, such that, when the adjustment mechanism is adjusted, the adjustment mechanism (i) winds the cable around the first cable-spooling portion of the adjustment mechanism or the second cable-spooling portion of the adjustment mechanism, and (ii) adjusts the exposed length of the retractable side strap to allow the head-wearable device to accommodate respective head sizes for a plurality of users of the head-wearable device.

2. The head-wearable device of claim 1, wherein the anchor point is at least one of a fixed pulley, a moving pulley, or a static post.

3. The head-wearable device of claim 1, wherein the adjustment mechanism includes a single drum or a double drum coupled to an exposed handwheel for manual user adjustment.

4. The head-wearable device of claim 3, wherein the exposed handwheel has a predetermined diameter, wherein the exposed handwheel extends, in part, outside of the housing.

5. The head-wearable device of claim 1, wherein the adjustment mechanism is coupled to a spring element, such that the cable maintains the predetermined tension.

6. The head-wearable device of claim 1, wherein the anchor point is coupled to a spring element, such that the cable maintains the predetermined tension.

7. The head-wearable device of claim 1, wherein the cable is coupled to a spring element, such that the cable maintains the predetermined tension.

8. The head-wearable device of claim 1, wherein the anchor point is one of a plurality of anchor points and a respective anchor point of the plurality of anchor points is coupled to a spring element and the cable, such that the cable maintains the predetermined tension.

9. The head-wearable device of claim 1, wherein:

the first cable-spooling portion of the adjustment mechanism is configured to be positioned a first distance away from a user's head when the head-wearable device is worn by the user and the second cable-spooling portion of the adjustment mechanism is configured to be positioned a second distance away, larger than the first distance, from the user's head when the head-wearable device is worn by the user.

10. The head-wearable device of claim 9, where the first cable-spooling portion of the adjustment mechanism includes a first radius and the second cable-spooling portion includes a second radius.

11. The head-wearable device of claim 1, wherein when the adjustment mechanism is actuated in a first direction:

a part of the first windable segment of the cable unwinds around the first cable-spooling portion of the adjustment mechanism, and a part of the second windable segment of the cable winds around the second cable-spooling portion of the adjustment mechanism.

12. The head-wearable device of claim 11, wherein when the exposed length of the retractable side strap is at its longest length, the first windable segment of the cable has a first length of cable wound around the first cable-spooling portion of the adjustment mechanism and the second windable segment of the cable has a second length of cable wound around the second cable-spooling portion of the adjustment mechanism, the second length being less than the first length.

13. The head-wearable device of claim 11, wherein when the adjustment mechanism is actuated in a second direction:
- the part of the first windable segment of the cable winds around the first cable-spooling portion of the adjustment mechanism, and
- the part of the second windable segment of the cable unwinds around the second cable-spooling portion of the adjustment mechanism.

14. The head-wearable device of claim 13, wherein when the exposed length of the retractable side strap is at its shortest length, the first windable segment of the cable has a third length of cable wound around the first cable-spooling portion of the adjustment mechanism and the second windable segment of the cable has a fourth length of cable wound around the second cable-spooling portion of the adjustment mechanism.

15. The head-wearable device of claim 11, wherein the first windable segment of the cable winds around the first cable-spooling portion of the adjustment mechanism at a first rate and the second windable segment of the cable unwinds around the second cable-spooling portion of the adjustment mechanism at a second rate.

16. The head-wearable device of claim 1, wherein the retractable side strap includes cut out portions to guide the cable.

17. The head-wearable device of claim 1, wherein
- the retractable side strap includes a first end and a second end,
- the first end of the retractable side strap is positioned at a first end of the housing and the second end of the retractable side strap is positioned at a second end of the housing when the retractable side strap is at its longest length, and
- the first end of the retractable side strap is positioned at the second end of the housing and the second end of the retractable side strap is at the first end of the housing when the retractable side strap is at its shortest length.

18. The head-wearable device of claim 17, wherein a first portion of the intermediary portion of the cable travels through a portion of the first end of the retractable side strap and a second portion of the intermediary portion of the cable travels through a portion of the second end of the retractable side strap:
- when the adjustment mechanism is actuated in a first direction, the intermediary portion of the cable moves around the anchor point such that the first end of the retractable side strap moves towards the second end of the housing and the second end of the retractable side strap moves toward the first end of the housing, causing a length of the retractable side strap to decrease; and
- when the adjustment mechanism is actuated in a second direction, the intermediary portion of the cable moves around the anchor point such that the first end of the retractable side strap moves towards the first end of the housing and the second end of the retractable side strap moves toward the second end of the housing, causing the length of the retractable side strap to increase.

19. The head-wearable device of claim 17, wherein when the adjustment mechanism is actuated in a first direction a predetermined amount, the second end of the retractable side strap travels behind the first end of the retractable side strap.

20. A method for forming a head-wearable device, comprising:
- providing a display; and
- providing a retractable side strap coupled with the display, the retractable side strap including a housing, wherein the housing is formed by:
  - providing an anchor point,
  - providing a cable, wherein an intermediary portion of the cable includes a first windable segment extending from a first end of the cable and a second windable segment extending from a second end of the cable
  - providing an adjustment mechanism configured to be adjusted to change an exposed length of the retractable side strap that is outside of the housing, wherein actuation of the adjustment mechanism results in winding or unwinding of at least a portion of each of the first windable segment and the second windable segment, and
  - providing at least one of the adjustment mechanism and the anchor point maintaining the cable at a predetermined tension, such that, when the adjustment mechanism is adjusted, the adjustment mechanism (i) winds the cable around a first cable-spooling portion of the adjustment mechanism or a second cable-spooling portion of the adjustment mechanism, and (ii) adjusts the exposed length of the retractable side strap to allow the head-wearable device to accommodate respective head sizes for a plurality of users of the head-wearable device.

* * * * *